United States Patent [19]
Klauber et al.

[11] Patent Number: 5,287,735
[45] Date of Patent: Feb. 22, 1994

[54] ENGINE MISFIRE OR ROUGHNESS DETECTION METHOD AND APPARATUS

[75] Inventors: Robert D. Klauber; Erik B. Vigmostad, both of Fairfield, Iowa

[73] Assignee: Sensortech L.P., Fairfield, Iowa

[21] Appl. No.: 625,222

[22] Filed: Dec. 10, 1990

[51] Int. Cl.$^5$ .......................................... G01M 15/00
[52] U.S. Cl. ........................................ 73/116; 73/660
[58] Field of Search ................. 73/116, 117.2, 117.3, 73/660, 862.23, DIG. 2; 364/431.08; 74/859

[56] References Cited

U.S. PATENT DOCUMENTS

| | | | |
|---|---|---|---|
| 2,912,642 | 11/1959 | Dahle . | |
| 3,011,340 | 12/1961 | Dahle . | |
| 3,939,711 | 2/1976 | Hanaoka | 73/116 |
| 4,295,363 | 10/1981 | Buck et al. | 73/117.3 |
| 4,313,341 | 2/1982 | Yamaguchi et al. | 73/117.3 |
| 4,337,647 | 7/1982 | Radcliffe et al. | 73/116 |
| 4,414,856 | 11/1983 | Winterhoff | 73/862.36 |
| 4,424,709 | 1/1984 | Meier, Jr. et al. | 73/117.3 |
| 4,503,714 | 3/1985 | Winterhoff | 73/862.36 |
| 4,589,290 | 5/1986 | Sugiyama et al. | 73/DIG. 2 X |
| 4,606,005 | 8/1986 | Ribbens | 364/431.01 |
| 4,697,459 | 10/1987 | Nonomura et al. | 73/862.36 |
| 4,697,460 | 10/1987 | Sugiyama et al. | 73/862.36 |
| 4,760,745 | 8/1988 | Garshelis | 73/862.36 |
| 4,778,956 | 12/1988 | Suzuki et al. | 73/116 |
| 4,803,885 | 2/1989 | Nonomura et al. | 73/862.36 |
| 4,805,466 | 2/1989 | Schiessle et al. | 73/DIG. 2 X |
| 4,817,444 | 4/1989 | Yagi et al. | 73/DIG. 2 X |
| 4,848,870 | 7/1989 | Citron et al. | 73/116 |
| 4,886,029 | 12/1989 | Lill et al. | 123/479 |
| 4,928,228 | 5/1990 | Fujimoto et al. | 364/431.09 |
| 4,932,379 | 12/1990 | Tang et al. | 123/436 |
| 4,939,937 | 7/1990 | Klauber et al. | 73/862.36 |
| 4,940,030 | 7/1990 | Morikawa | 123/198 |
| 5,044,195 | 9/1991 | James et al. | 73/117.3 |
| 5,069,183 | 12/1991 | Nagano et al. | 73/117.3 |

FOREIGN PATENT DOCUMENTS

| | | |
|---|---|---|
| 0352187 | 1/1990 | European Pat. Off. . |
| 2704590 | 8/1978 | Fed. Rep. of Germany . |
| 3823935 | 1/1990 | Fed. Rep. of Germany . |

OTHER PUBLICATIONS

Invitation to Pay Additional Fees, The International Searching Authority Partial International Search, May 12, 1992.

SAE Paper 870472, "Measurement of Engine Torque with the Intra-Bearing Torque Sensor", Nonomura, Sugiyama, et al, Feb. 1987 Soc. of Autom Engs. Presentation.

Jun Sugiyama, et al. Noncontacting Magnetic Torque Sensor: Rapid Measurement of Mean Torque of Each Cylinder in Each Cycle, Transducer 87.

Beth and Meeks, Magnetic Measurement of Torque in a Rotating Shaft, The Review of Scientific Instruments vol. 25, No. 6, Jun. 1954 pp. 603-607.

Ribbens and Rizzoni, Onboard Diagnosis of Engine Misfires SAE Technical Paper Series No. 901768 Sep. 17-20, 1990.

SAE Technical Paper Series 890486, Cylinder by Cylinder Engine Pressure and Pressure Torque Waveform Determination Utilizing Speed Fluctuations by: Stephen J. Citron, John E. O'Higgins and Lillian Y. Chen Feb. 27/Mar. 3, 1989.

(List continued on next page.)

*Primary Examiner*—Jerry W. Myracle

[57] ABSTRACT

A method and apparatus for comparing torsional stress/strain states of a power transmitting member of an internal combustion engine to detect an abnormal combustion condition, including misfire or roughness. A first signal is obtained relating to the torsional stress in the member produced by a first combustion event or series of events. A second signal is obtained which relates to the torsional stress in the member produced by a second combustion event or series of events. The first and second signals are compared to detect the abnormal combustion event in the operation of the engine. A magnetostrictive sensor may preferably be used to obtain the signals relating to the torsional stress in the power transmitting member, such as the engine crankshaft.

74 Claims, 8 Drawing Sheets

OTHER PUBLICATIONS

SAE Technical Paper Series 8900485, On Line Cylinder Diagnostics on Combustion Engines by Noncontact Torque and Speed Measurements by: Georg F. Mauer and Robert J. Watts Feb. 27–Mar. 3, 1989.

SAE Technical Paper Series 890884, Diagnosis of Individual Cylinder Misfires by Signature Analysis of Crankshaft Speed Fluctuations by: G. Rizzoni Feb. 27–Mar. 3, 1989.

SAE Technical Paper Series, Magnetostrictive Torque Sensors—Analysis of Performance Limits by: William J. Fleming, Feb. 27–Mar. 3, 1989.

IEEE Trans on Vehicular Technology, vol. VT-24, No. 2, May 1975, Monitoring Combustion Quality in Internal Combustion Engines Using Spark Plug as a Plasma Probe, by: Johnson & Rado.

SAE paper 900232, 1990, Methods of On-Board Misfire Detection by: Plapp et al.

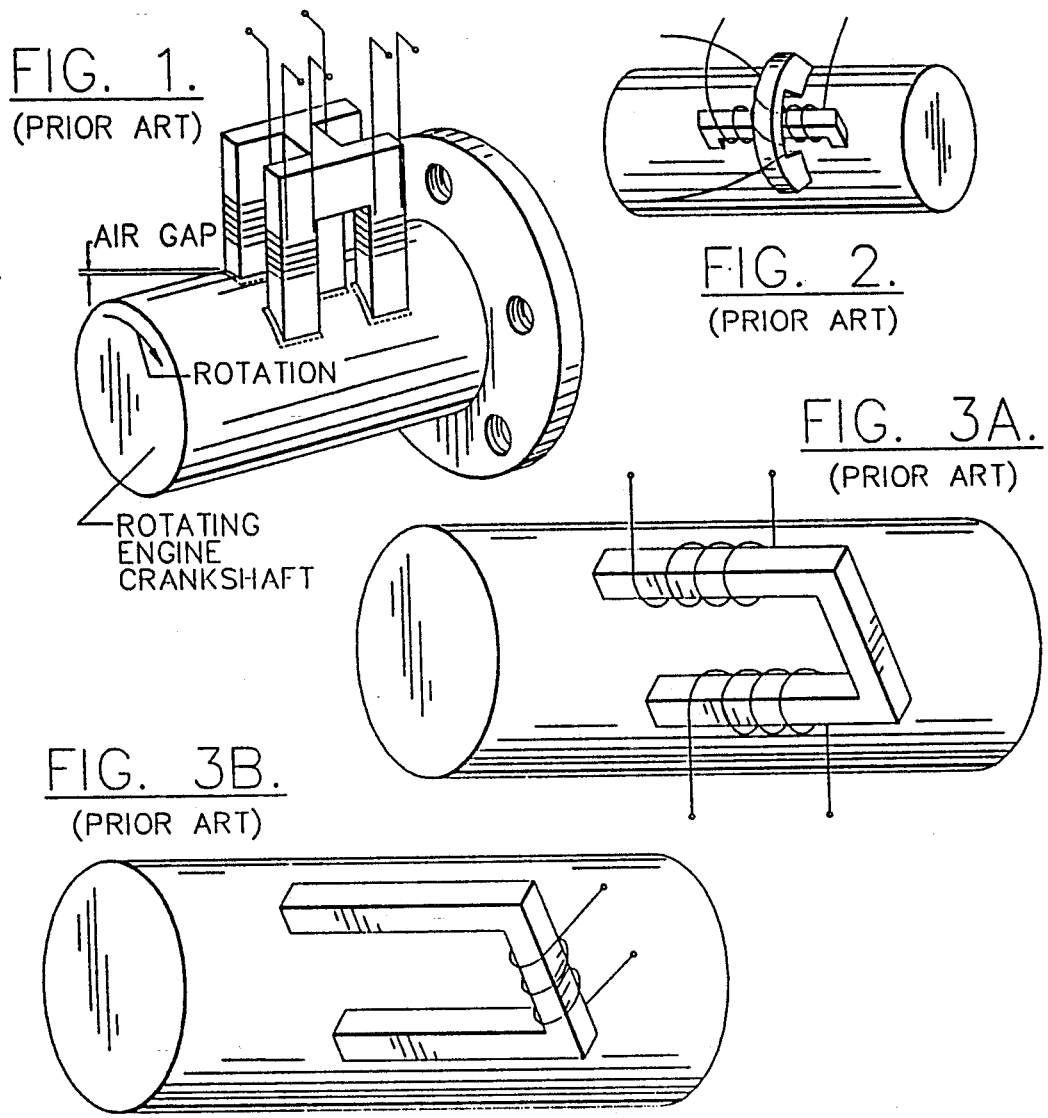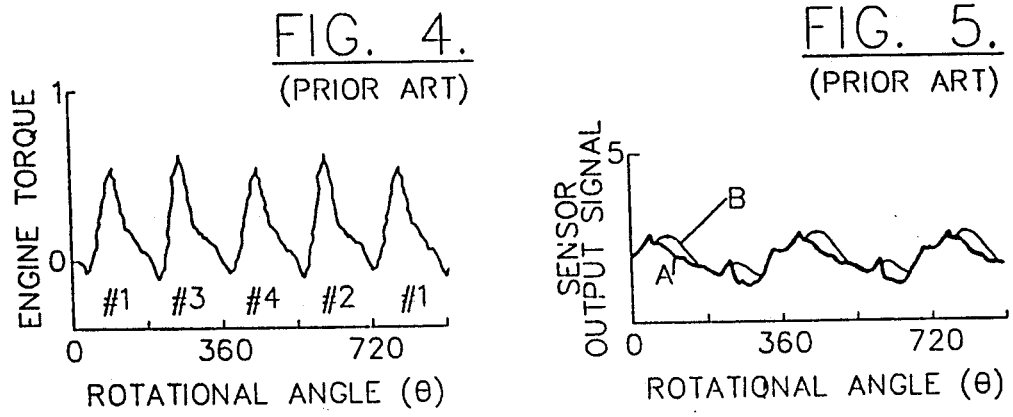

ENGINE MISFIRE OR ROUGHNESS DETECTION METHOD AND APPARATUS

FIELD OF THE INVENTION

This invention relates to internal combustion engine misfire and roughness detection and more particularly to a method and apparatus for detecting engine misfire or roughness using signals generated relating to the torque of an operating internal combustion engine.

BACKGROUND OF THE INVENTION

Two primary objectives of automobile engine control systems are to maximize engine performance, such as power for passing, etc., and to minimize fuel consumption. Rough running engines affect both power output and fuel economy adversely. Onboard monitoring and control systems should be able to detect and, in some instances, correct for such roughness. Roughness may be due to incomplete burning of fuel in one or more cylinders. Extreme engine roughness occurs during cylinder misfire, that is, when no fuel is burned in one or more cylinders. Misfire can occur for several reasons, including lack of spark from the ignition system, malfunctioning of the fuel injection system, lack of sufficient air intake, faulty valves, etc.

While detection of roughness and misfiring during vehicle operation is highly desirable from the standpoints of performance and fuel economy, it has significant environmental impact as well. Incomplete burning of fossil fuels is a prime source of air pollution. An engine which misfires only 2% of the time, for example, may produce pollutant levels which exceed emission standards by 150%.

Governmental regulations covering emissions caused by cylinder misfire are being proposed. For example, the state of California has already notified automakers that beginning with the 1994 model year, vehicles sold in California must have onboard means for detecting and warning of cylinder misfire. Such means must be capable of identifying which particular cylinder is misfiring, or in the case of multiple cylinder misfire, indicating that more than one cylinder is misfiring. California regulators have also stated they would prefer a system which could additionally: determine precisely which cylinders are misfiring in the case of multiple misfires; identify sporadic, non-periodic misfiring events; detect isolated misfires occurring a small percentage of the time, for example, 1 misfire for every 1,000 or more firings; and function properly under all engine speeds and driving conditions. Other states, as well as the U.S. Environmental Protection Agency, have indicated that they may issue cylinder misfire regulations similar to those proposed for California.

Prior art devices for roughness and misfire detection in internal combustion engines have utilized several different approaches. For example, the measurement of rotational speed (RPM) fluctuations is disclosed in U.S. Pat. Nos. 4,843,870 to Citron et al., and 4,932,379 to Tang et al.; and SAE papers #900232 by Plapp et al., #890486 by Citron et al., and #890884 by Rizzoni.

Detecting roughness and misfire has also been attempted by determining the absence of a spark in the ignition system as disclosed in U.S. Pat. Nos. 4,886,029 to Lill et al. and 4,928,228 to Fujimoto. The spark plug has also been used as a plasma probe as described in Johnson and Rado, "Monitoring Combustion Quality in Internal Combustion Engines Using Spark Plug as s Plasma Probe," IEEE Transactions on Vehicular Technology Vol VT-24, No 2, May 1975.

Sensing temperature at the exhaust port of each cylinder is disclosed in U.S. Pat. No. 3,939,711 to Hanaoka. Using non-magnetostrictive torque sensing and speed measurements is disclosed in SAE paper #890485 by Mauer et al. A generic torque sensor and comparing mean or maximum versus minimum torque signals (and typically other signals such as RPM, accelerator depression level, etc.) to expected values stored in computer memory, is disclosed in U.S. Pat. Nos. 4,606,005 to Ribbens, and 4,940,030 to Morikawa. Monitoring exhaust chemistry, such as with a Lambda oxygen sensor in the exhaust flow, is taught in SAE paper #900232 by Plapp et al.

Each of these prior art approaches has disadvantages and it is likely that none may meet the strict standards that the California regulators and others seek. For example, rotational speed fluctuation detection is computationally intensive, is typically limited to engine speeds below 3500 to 4000 RPM, and has difficulty detecting non-repetitive misfires. Moreover, engine speed detection is subject to false alarms for vehicles operating on rough roads. A rough road will induce speed changes into the engine driveline at the drive wheels, irrespective of any engine misfire. These road induced speed changes will effectively mask the changes in speed that may be caused by engine misfire.

Detecting the absence of a spark will not detect misfire if the misfire is caused by fuel injection, valve, or other mechanical malfunctions. Plasma probing, temperature sensing, and exhaust gas chemistry sensing are all too slow and, heretofore, impractical for detecting low percentage misfire states. Further, exhaust gas sensing cannot identify which cylinder, or cylinders, are faulty. Torque sensing using non-magnetostrictive torque sensors are typically too large and unwieldy—often also requiring two or more monitoring locations along the crankshaft. Non-magnetostrictive torque sensors, such as strain gauge torque sensors, are impractical for mass production and extensive usage. U.S. Pat. Nos. 4,606,005 and 4,940,030 disclose using generic torque sensors; however, to the best of Applicants' knowledge, no such sensors currently exist which have proven suitable for automobile engine torque onboard monitoring.

A number of researchers have attempted to develop magnetostrictive torque sensors. Magnetostrictive torque sensors take advantage of the magnetostrictive property of ferromagnetic materials whereby tension stress in the material causes an increase in an induced magnetic field B in the material. Compressive stress causes a decrease in the induced magnetic field B. Typically an alternating current carrying coil is used to induce the magnetic field B into a ferromagnetic torque transmitting shaft. A secondary pickup coil, or other means, then monitors the change in the induced magnetic field B as the stress of the shaft changes with torque. The voltage signal generated across the secondary coil is an indicator of the torque. Specific geometry and the number of coils may vary for different magnetostrictive torque sensor designs, but the underlying principle is the same.

Typical magnetostrictive torque sensors are disclosed in U.S. Pat. Nos. 4,760,745 to Gashelis; 2,912,642 to Dahle; 4,414,856 to Winterhof; 4,589,290 to Sugiyama; 4,697,459 to Nonomura et al.; 4,939,937 to Klauber et al.; and application Ser. No. 07/518,083, now U.S. Pat. No. 5,144,846 to Klauber et al. The sensor disclosed in U.S. Pat. No. 4,760,745, for example, is a four solenoidal coil design which is inherently larger and is, therefore, typically more expensive and less suited for automotive application than the other types of magnetostrictive torque sensors. The other sensors may be miniaturized and are less expensive, but are limited by the random anisotropic variations in magnetic permeability of the iron and steel materials used in production crankshafts and driveshafts. These variations are inherent in the material and distort any measured induced magnetic field changes thereby resulting in inaccuracies and prohibiting the instantaneous monitoring of the power variations for individual cylinder misfiring or firing events.

Applicants are currently unaware of any system for roughness or misfire detection which is completely satisfactory. Moreover, Applicants are unaware of any system which may satisfy more stringent environmental regulations, such as those pending in California.

SUMMARY OF THE INVENTION

It is therefore an object of the present invention to provide a method and apparatus for detecting engine roughness or misfire which detects single or multiple events over all engine and vehicle operating speeds and conditions.

It is another object of the present invention to provide a method and apparatus for providing accurate engine roughness or misfire detection for each individual cylinder.

It is yet another object of the present invention to provide a method and apparatus for providing accurate engine roughness or misfire detection in conjunction with existing engine driveline materials.

It is still another object of the present invention to provide a method and apparatus for providing accurate engine roughness or misfire detection using available magnetostrictive sensors which are compact and may be readily adapted for existing engines.

It is a further object of the present invention to provide a method and apparatus for providing accurate engine roughness or misfire detection nearly instantaneously and with minimal computational requirements.

It is still a further object of the present invention to provide a method and apparatus that does not require actual torque measurement and that may employ any type of torque sensor in a simple and direct manner.

These and other objects are provided by the method and apparatus according to the present invention. The present invention solves the problems relating to engine misfire and roughness detection exhibited in the prior art. A first signal is obtained related to the torsional stress in a power transmitting member produced by a first at least one combustion event in an internal combustion engine coupled to the power transmitting member. A second signal is obtained relating to the torsional stress produced by a second at least one combustion event. The first and second signals may then be compared to detect an abnormal combustion event in the operation of the engine, such as misfire or roughness.

The present invention uses a signal dependent on the stress/strain state of a power transmitting shaft in the engine, such as the crankshaft, or connected to the engine, such as the drive shaft. Since stress/strain in a shaft is related to the torque transmitted by the shaft, this signal is a function of torque even though it might not of itself be a direct indicator of torque. This signal may be generated by strain gages mounted on the shaft, by optical or other electromagnetic wave measurement of strain in the shaft, by twist angle measurement of the shaft, by magnetostrictive means, or by any other means. This signal may be a direct and accurate indicator of torque, though it is more typically merely a signal which is partially a function of torque and partially dependent on other factors, such as temperature, shaft material anisotropies, etc. which vary independently of torque. Hence, the signal need not be a direct indication of torque, and the present invention need not incorporate direct torque sensing.

The invention compares signals generated at different points of the cylinder firing order. For a signal which is an accurate indicator of torque, the comparison is relatively straightforward. The torque may be measured when any given combustion chamber, typically a cylinder, is firing and then compared with the very next cylinder that fires. In other embodiments, any cylinder firing can be compared with any other(s). If a given cylinder is misfiring or not burning completely, its torque related signal will be significantly less than that of a properly firing cylinder. A torque related signal difference significantly greater than a given threshold value would indicate roughness; above another threshold, misfiring.

Many variations on this theme lie within the scope of the invention. For example, each cylinder's firing or non-firing event may be compared with more than one or an average of a plurality of other cylinder firing or non-firing events. It may also be compared with one or more or an average of a number of its own previous such events.

In addition, each torque related signal can be taken at any given instant during or after the power stroke, or it can be an integrated value over all or some portion of the power stroke or even some portion after the power stroke. The first or any higher time derivative of the signal may be used as well.

Further, the two or more signals to be compared do not necessarily have to be from the same point or region of the firing stroke period. For example, the peak, or near peak, torque point in the firing stroke is typically around 35° beyond top dead center (beyond TDC) of the crankshaft rotation in a four cycle engine. A signal related to the torque at this point may be compared with a torque-related signal at any other point in the stroke—typically experiencing a much lower torque, such as the 0° or 90° beyond TDC points of shaft rotation. As another example, the peak (or near peak) torque-related signal may be compared in similar manner with the mean torque signal for the entire stroke, or with the minimum (or near minimum) torque signal, or with an integrated, or other signal. This comparison can be done for each cylinder and calculated as a quantified value, that is, a difference or ratio or any other means for quantification. If this quantified value is less than or greater than a given threshold value, roughness or misfire is indicated.

This quantified value for each cylinder firing stroke may be further (or instead) compared with one or more other such value(s) for another cylinder, a plurality of other cylinders, an average (weighted or otherwise) of a plurality of other cylinders, one or more previous firing event(s) of the same cylinder, some average of previous firing events of the same cylinder, or any combination thereof. A significant disparity of the single event/single cylinder quantified value from one or more of these other possible quantified value(s) indicates roughness or misfire.

The present invention is simpler than approaches disclosed in the prior art and is also highly accurate and reduces computer memory requirements as well. For example, since the present invention compares two signals from two different cylinder events juxtaposed, or nearly juxtaposed, in time means that errors from differences in temperature, shaft speed, engine load, level of depression of the accelerator pedal, acceleration effects, etc. are virtually non-existent. The present invention requires no look-up table matrixed via temperature, speed, pedal depression, etc. to determine a reference signal to compare with the monitored signal. One signal from one firing event is simply compared with one or more other firing events which occur under almost identical driving conditions. A difference in the comparison indicates roughness or misfire.

The present invention may also use a magnetostrictive measurement sensor. Such sensors, though greatly advantageous from miniaturization and cost standpoints, have been limited for use in direct torque measurement because of their undesirable signal dependence on temperature, shaft material variations, and shaft speed. However, the present invention may readily use magnetostrictive sensors because the present invention merely compares two signals wherein a quantified value obtained from such a comparison will vary with cylinder pressure, but it will be virtually independent of temperature, shaft speed, and material variations. Hence, the present invention permits inaccurate signals from typical magnetostrictive sensors to be used to yield a truly accurate indication of roughness and, particularly, of the extreme roughness resulting from engine misfire.

The present invention, therefore, comprises any embodiment wherein one signal related to torque produced in an engine driven shaft, whether or not such signal is an accurate indication of torque, is compared with another signal also related to torque, whether such other signal is an accurate indication or not of such torque. The resultant comparison is an accurate indication of roughness or misfire produced by an individual cylinder firing or non-firing event. The present invention, in its various embodiments, thereby solves each of the problems associated with prior art in a superior and wholly satisfactory manner.

BRIEF DESCRIPTION OF THE DRAWINGS

FIG. 1 is a front perspective view of a prior art magnetostrictive sensor design known as the "four branch" design.

FIG. 2 is a side view of a prior art magnetostrictive sensor design known as the "cross" design.

FIG. 3A is a side view of a prior art magnetostrictive sensor design known as the "single" branch or "C core" design.

FIG. 3B is a prior art side view of the magnetostrictive design shown in FIG. 3A incorporating a single coil as both the driver and the pickup coil.

FIG. 4 is a prior art graph representing torque produced by a four cylinder internal combustion engine.

FIG. 5 is a prior art graph of typical magnetostrictive torque sensor signals.

FIGB. 11A-11C are schematic diagrams depicting misfire or roughness sensing during rotation of an engine crankshaft in a method according to the present invention incorporating multiple sensors.

Figure 12:
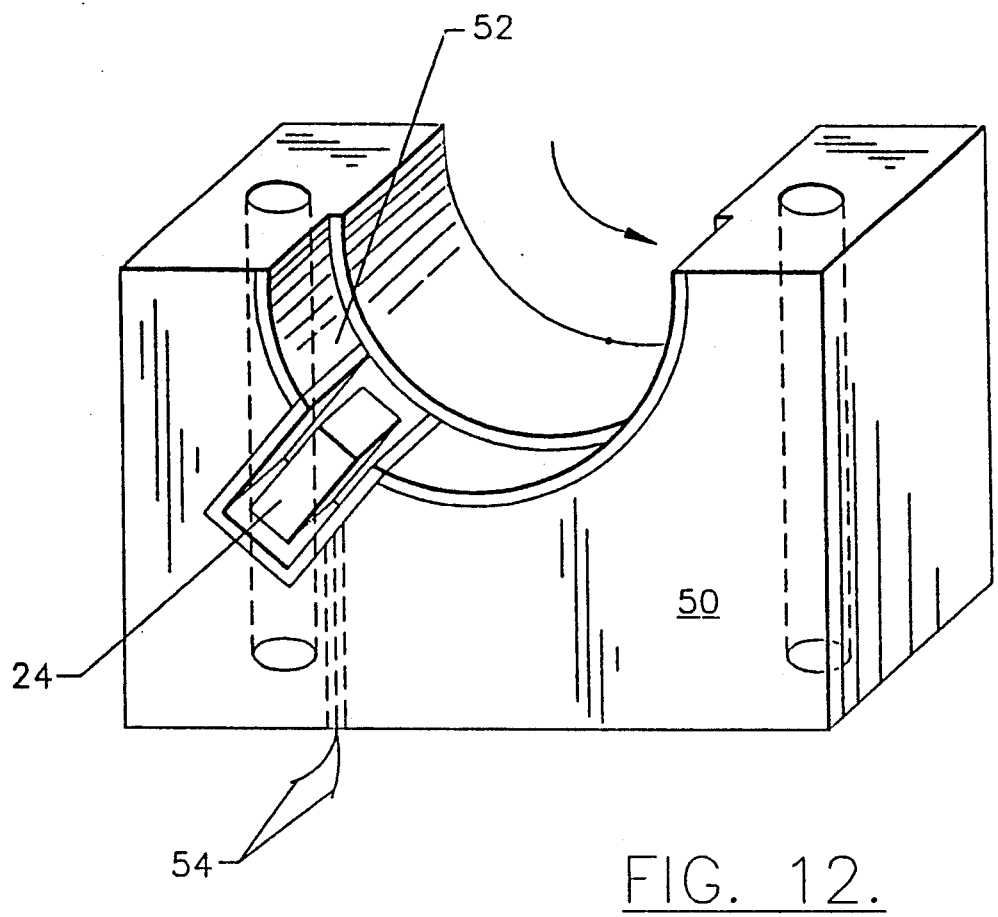

FIG. 12 is a front perspective cut-away view of a magnetostrictive sensor positioned in a crankshaft bearing according to the present invention.

Figure 13:
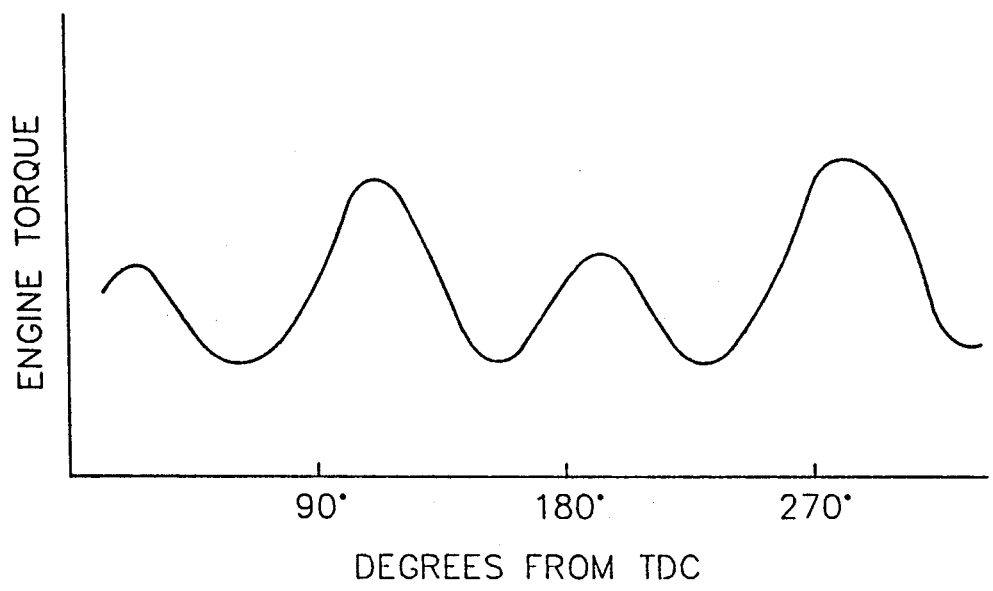

FIG. 13 is a graph illustrating a typical engine torque curve at high engine speed.

Figure 14:
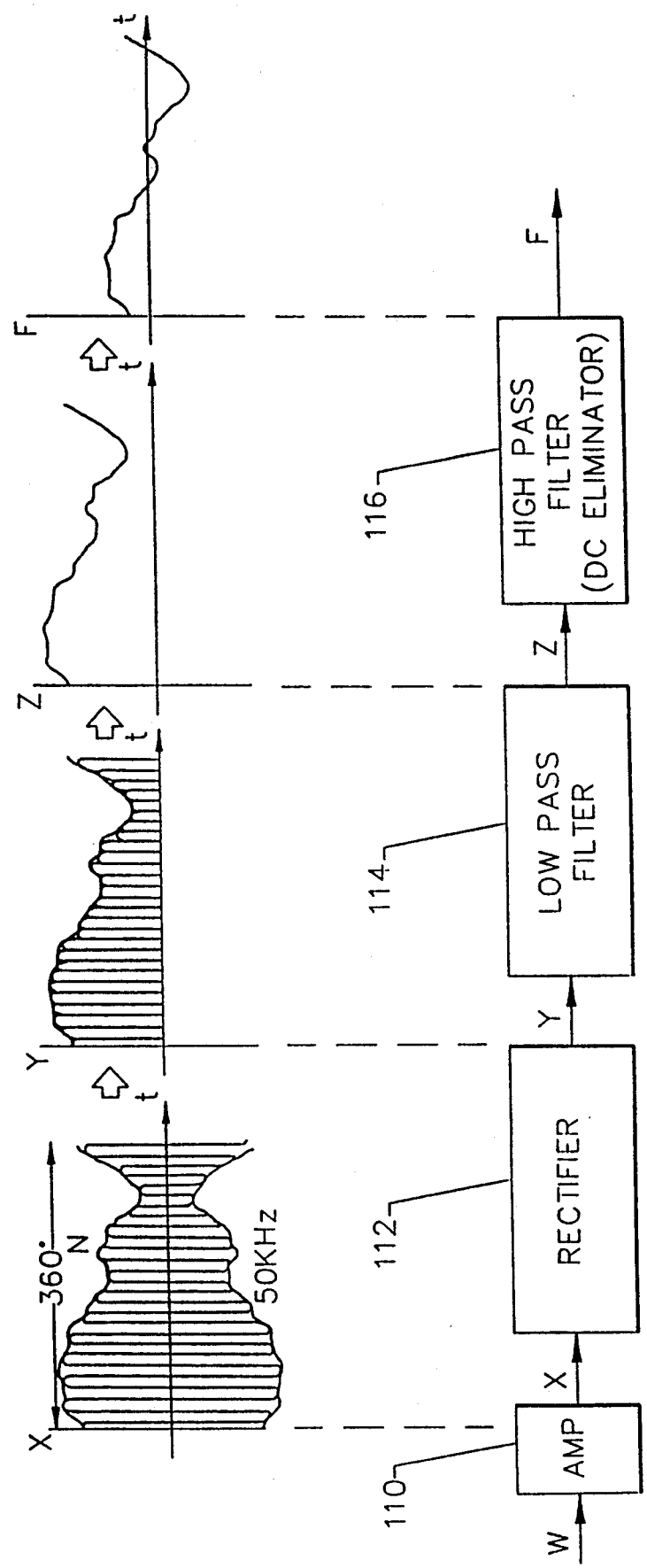

FIG. 14 is a schematic block diagram illustrating a method according to the present invention.

Figure 15:
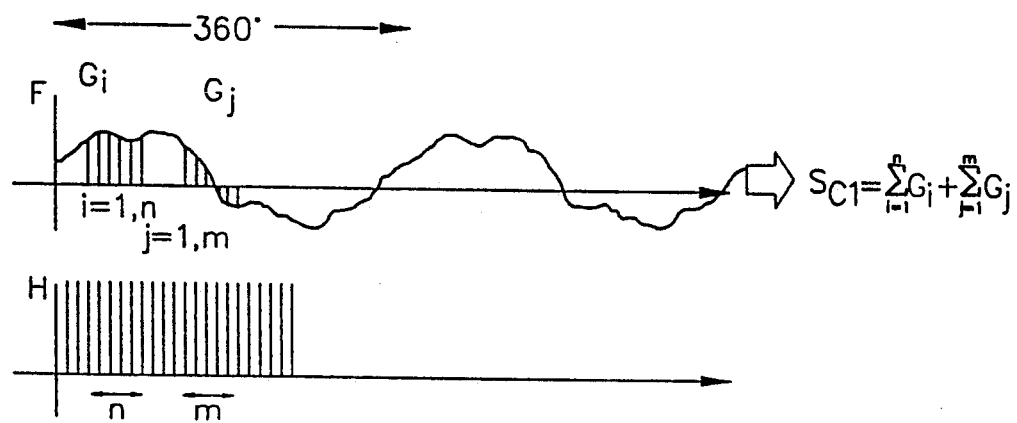

FIG. 15 is a graph of signals generated in a method according to the present invention.

Figure 16:
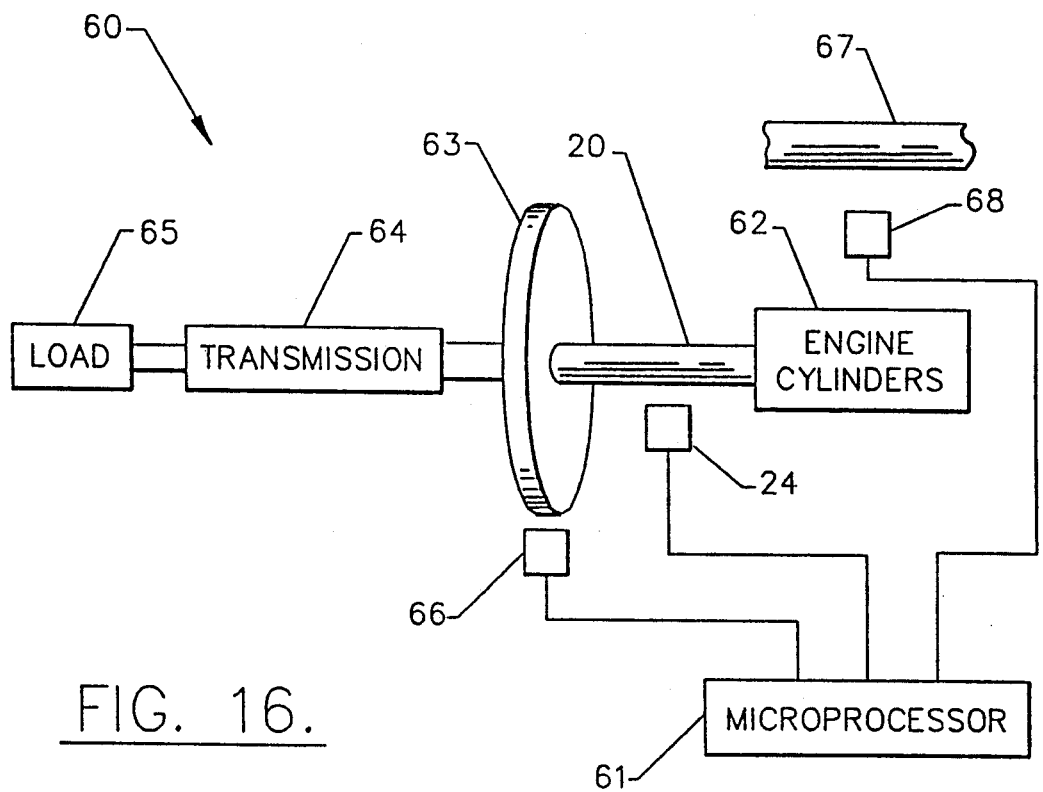

FIG. 16 is a schematic diagram of an apparatus for detecting misfire or roughness according to the present invention.

Figure 17:
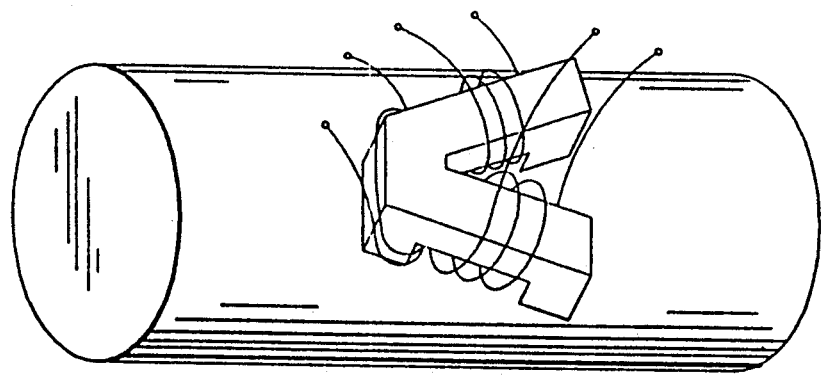

FIG. 17 is a side view of a dual branch magnetostrictive sensor of the prior art.

DETAILED DESCRIPTIONS OF PREFERRED EMBODIMENTS OF THE INVENTION

The present invention will now be described more fully hereinafter with reference to the accompanying drawings, in which preferred embodiments of the invention are shown. This invention may, however, be embodied in many different forms and should not be construed as limited to the embodiments set forth herein; rather, applicant provides these embodiments so that this disclosure will be thorough and complete, and will fully convey the scope of the invention to those skilled in the art.

The most promising misfire or roughness detection scheme of prior art, as disclosed for example in SAE paper #890884, has difficulty detecting misfire above 4000 RPM, may be subject to false alarms on rough roads, and may be computationally too intensive. The present invention, in different embodiments, solves these and other problems associated with prior art.

The invention may operate using an accurate and direct torque sensor, but more significantly, the invention does not require such a device. Rather than an accurate and direct torque signal, any signal may be used that is related to torque, as well as related to other factors, such as temperature, shaft material variations, shaft speed, shaft acceleration, accelerator depression level, etc. Since a true, accurate torque sensor does not currently exist meeting size and cost constraints of automobile design, the ensuing descriptions focus on the lattermost of these two cases, that is, the case in which no true torque signal independent of other factors is available. Since several magnetostrictive sensor designs exist which meet cost and design requirements, but that have signal accuracy problems, emphasis in the following description of various embodiments of the present invention will be on using a magnetostrictive sensor. It should be clearly understood that the invention is not limited to magnetostrictive sensors and that other sensors may be used as would be readily understood by those having skill in the art.

Although the description is directed for the most part to four cylinder and four stroke engines, the invention may be used with other combinations of cylinders and with two, or other stroke, engines as would be readily understood by those having skill in the art. Further, "ignition spark" and "timing" as used herein when discussing combustion in a cylinder, also refers equally to non-spark ignited engines, such as diesel engines, as would be readily understood by those having skill in the art.

FIG. 1 shows a typical magnetostrictive sensor design as shown in U.S. Pat. Nos. 4,414,856 and 4,503,714 for example, and is commonly referred to as the "four branch" design. FIG. 2 shows an alternative design as shown in U.S. Pat. Nos. 2,912,642, 3,011,340, 4,589,290, and 4,939,937 for example, and is known as the "cross" design. FIG. 3 depicts yet another design known as the "single branch" or "C-core" design. Other designs exist, notably the solenoidal design as shown in U.S. Pat. No. 4,760,745 for example, and the "double", or generically, "multiple branch" designs. FIG. 17 illustrates a dual branch magnetostrictive sensor. These designs typically employ one or more primary, or excitation, coils to generate magnetic flux in the shaft. They also typically employ one or more secondary, or pick-up, coils that monitor the changes which may occur in the magnetic flux in the shaft. The coils are commonly wound around ferromagnetic cores. Changes in torque produce changes in the torsional stress on the shaft which causes strain in the shaft. Due to the principle of magnetostriction, the stress/strain changes produce changes in the magnetic flux in the shaft. These flux changes produce voltage changes in the secondary coil(s), and hence, the voltage level across the secondary coil(s) is related to the torque applied to the shaft.

Other designs exist with some modifications to this basic theme. For example, U.S. Pat. No. 4,939,937 and application Ser. No. 07/518,083 show a magnetostrictive sensor in which the primary coil(s) and the secondary coil(s) are the same. The present invention shown herein is not limited in any way by the particular magnetostrictive sensor; rather, the present invention relates to use of any magnetostrictive sensor design, and any design limitations in ensuing discussions are shown solely for the purpose of simplifying the explanation.

FIG. 4 is a typical measured output torque curve of a normally firing four cylinder engine as a function of shaft rotational angle from TDC. Note that as each cylinder fires, the torque rises, peaks, and then falls off. Each torque peak in FIG. 4 is labeled with the number of the firing cylinder causing the respective peak. Again for reasons of simplicity, these cylinder numbers and the firing order will be referred to in the following descriptions of the various embodiments of the present invention, but the various embodiments are not so limited.

FIG. 5 illustrates a typical signal output, such as voltage from a magnetostrictive sensor. Curve A represents the unloaded, or zero torque, rotating shaft measurement response. The erratic signal level is a result of random variations in the shaft magnetic permeability tensor at different locations on the shaft. The directions of the principal, maximum and minimum permeability, axes and the magnitudes of the principal permeabilities vary around the shaft circumference. As a result, the inductances seen by the primary coil and the secondary coil in the sensor change as the shaft turns. Hence, the output voltage from the secondary coil varies substantially with angular shaft displacement even for a constant torque, such as zero torque in the present case. Note that curve A is periodic, repeating itself every 360° of shaft rotation.

Curve B in FIG. 5 represents a response from the same magnetostrictive sensor as that of curve A, however, curve B is the signal measured for a transmitted torque such as that shown in FIG. 4. In other words, curve B is the sensor output signal when the shaft is transmitting torque delivered from a typical four cylinder engine. Note that the signal of curve B exceeds that of curve A whenever a cylinder fires.

It is relevant that the shape of curves A and B vary significantly from shaft to shaft; hence, magnetostrictive torque sensors do not, in general, lend themselves to mass production or calibration. This disadvantage alone makes them impractical for automotive application to directly measure true engine torque from a shaft. In addition, the signal level from the sensor varies with temperature, shaft RPM, and even simply drifts with time.

The method and apparatus according to the present invention overcomes the limitations of magnetostrictive sensors by comparing different signals generated by cylinder firings, or misfirings, at the same location on the shaft or by comparing relative changes in such signals at different locations. Comparison of an individual firing event signal, or its relative change, to one or more other signals from other typically normal firing events may indicate a roughness or misfire determination of the individual firing event. By comparing such events when the time interval between them is small in human terms, for example less than a second or so, the engine RPM, temperature, accelerator depression level, shaft acceleration, and temporal drift effects become negligible. Comparing relative changes over longer time scales to historical "marker" type relative changes may also yield similar results.

Specific descriptions of several embodiments for carrying out the aforementioned comparisons are described below. The invention includes combinations of any number of the embodiments. For example, Embodiment 1 below can be used in conjunction with Embodiments 2 and 3. Any comparison of signals produced by different firing or non-firing events to determine roughness or misfire is but another embodiment of the present invention.

Embodiment 1

Figure 6A:
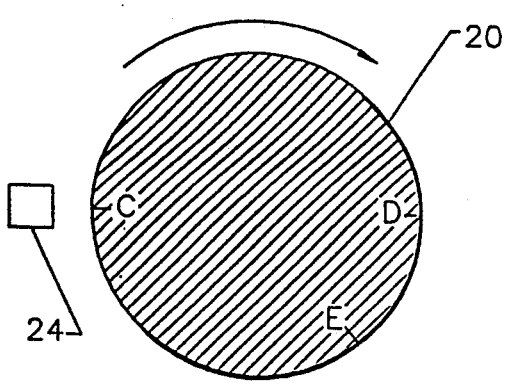
FIGS. 6A-6D are schematic diagrams depicting misfire or roughness sensing during rotation of an engine crankshaft in a method according to the present invention.
Figure 6B:
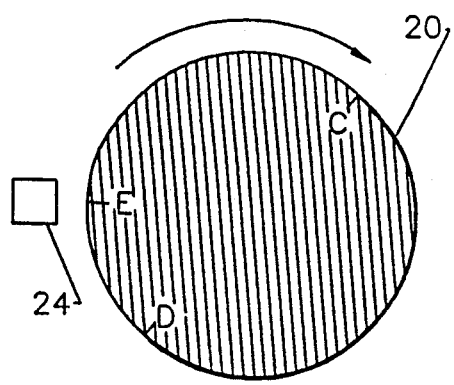
Figure 6C:
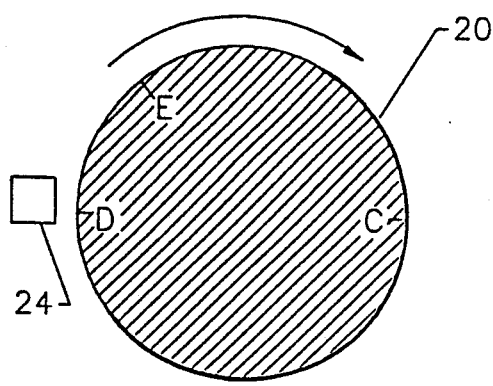
Figure 6D:
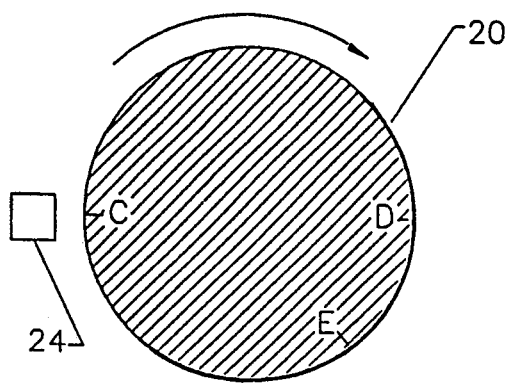

FIGS. 6A–6D show schematic diagrams of an end view of a shaft 20 and a sensor 24 whose signal is a function of shaft torsional stress/strain and possibly other factors, such as temperature, shaft material magnetic properties, and shaft speed. The sensor 24 may be a magnetostrictive sensor. FIGS. 6A–6D represent successively later points in time as the shaft rotates. In FIG. 6B, the shaft is shown rotated through an angle less than 180° from FIG. 6A. FIG. 6C shows the shaft rotated effectively 180° beyond its position in FIG. 6A; and in FIG. 6D the rotation has become a full 360°.

Point C in FIGS. 6A–6D denotes a point on the shaft circumference which is directly under the sensor 24 when cylinder #1 and cylinder #4 firing should occur once each during 720° of rotation as shown in FIG. 4. Point C typically would pass under the sensor 24 when, or nearly when, peak torque is being generated as illustrated in FIG. 4. Point D denotes a point effectively 180° around the shaft from point C and hence represents the equivalent of point C for intended firings of cylinders #2 and #3. In this discussion, $S_{C1}$ and $S_{C4}$ will denote the respective output signals from the sensor 24 when cylinders 1 and 4 should be firing. $S_{D2}$ and $S_{D3}$ will denote comparable signals for cylinders 2 and 3. Hence, in general, assuming all four cylinders are delivering equal torque during their respective power strokes, $S_{C1}=S_{C4}$ which is not equal to $S_{D2}=S_{D3}$. The equal signs result because the same sensor 24 is measuring the same stress/strain state at the same location on the shaft, as is especially important for a magnetostrictive sensor 24. For a magnetostrictive sensor, the same permeability tensor yields effectively the same inductances for the coils of the sensor at the same temperature for effectively the same RPM and effectively at the same time. The unequal relationship results since, even though all other factors are the same, the location on the shaft is different for sensing cylinders #1 and #4 as opposed to #2 and #3, and hence, the coil inductances of the sensor 24 are not the same in almost all practical cases.

Since $S_{C1}=S_{C4}$ when cylinders #1 and #4 deliver equal torque, and $S_{C1}$ does not equal $S_{C4}$ when they do not, monitoring $S_{C1}$ and $S_{C4}$ provides a means whereby misfire or roughness may be detected. If either cylinder is firing normally, and the other is not, the abnormally firing cylinder will produce a lower signal than that of the other. As would be readily understood by those having skill in the art, any of a host of different electronic circuits and software programs may be used to compare the signals and provide a quantitative measure of the difference between $S_{C1}$ and $S_{C4}$. The first signal, $S_{C1}$, may be stored in computer memory for one revolution of the shaft, until the second signal, for example $S_{C4}$, is measured. These two signals may then be compared via subtraction, division, or any other means to obtain a quantified value indicative of the variation between them. For example, the quantified value may be defined as $Q_C=S_{C1}-S_{C4}$. Whenever this quantified value exceeds a predetermined threshold value, a predetermined level of roughness is indicated. Exceeding other threshold values indicates other levels of engine roughness and exceeding an extreme threshold value indicates cylinder misfire.

Figure 7:
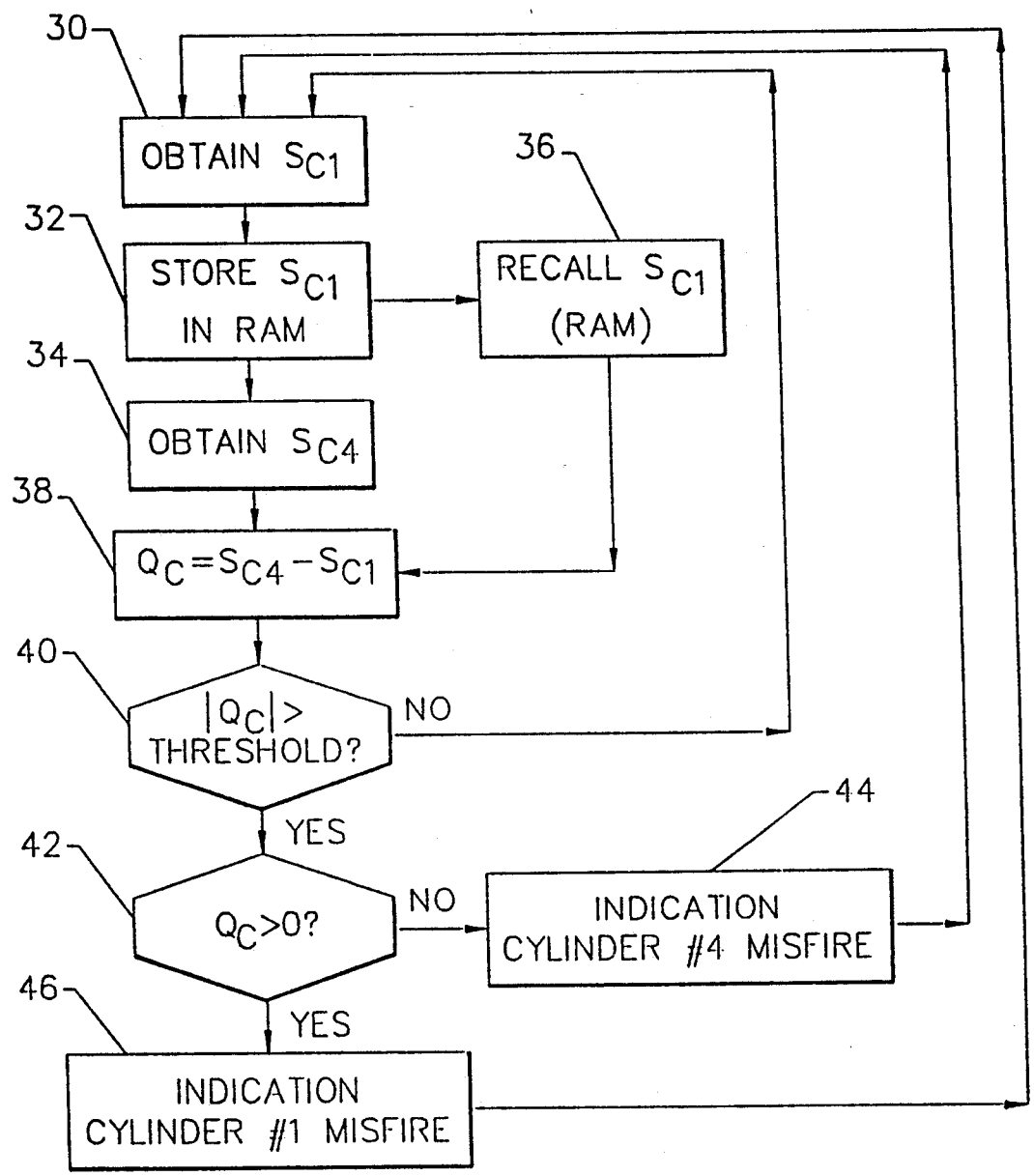
FIG. 7 is a flowchart illustrating a processing method according to the present invention.

FIG. 7 is a flowchart representing one of the ways to calculate the quantified value $Q_C$ and compare it to a threshold value to thereby indicate roughness or misfire. A first signal, $S_{C1}$, is obtained at Block 30 and stored in a random access memory (RAM) (Block 32). The second signal, $S_{C4}$ is then obtained at Block 34. The first signal, $S_{C1}$ is then recalled from RAM (Block 36) and subtracted from $S_{C4}$ to give a quantified value, $Q_C$ at Block 38. The absolute value of the quantified value, $Q_C$, is then compared to a predetermined threshold at Block 40. If the absolute value of the quantified value $Q_C$ does not exceed the predetermined threshold, the process repeats beginning at Block 30. If the absolute value of the quantified value $Q_C$ exceeds the threshold, the quantified value is then tested to be either positive or negative (Block 42). If the quantified value $Q_C$ is greater than zero, an indication that cylinder #1 has misfired is given (Block 46) and the process returns to the beginning at Block 30. If the quantified value $Q_C$ is less than zero, then an indication that cylinder #4 has misfired is given at Block 44 and the process then begins again at Block 30.

As would be readily understood by those having skill in the art, a similar process may be used with signals $S_{D2}$ and $S_{D3}$ to compare cylinders #2 and #3. By so doing, any roughness or misfire in any single cylinder may be readily detected.

Erratic roughness or misfiring in multiple cylinders may also be detected in all but the extreme case where cylinders #1 and #4, or #2 and #3, are both rough to the same degree or both misfiring 100% of the time. For intermittent misfiring of both cylinders #1 and #4 for example, in many cycles, one of the two cylinders would fire normally and misfire would then be readily detected. In any given cycle, the lesser of the two signals would represent the abnormally firing cylinder. Alternation of such indication between the two signals would signify multiple cylinder misfire. If 100% misfiring occurred in both cylinders, the engine would be barely operational, and need for repair would be evident. However, for cases where both cylinders misfire during any given measurement cycle, the variation of the invention shown in Embodiment 2 below may be used in conjunction with that described in Embodiment 1 to give precise information on multiple cylinder roughness or misfire.

Each of the aforementioned signals in this, or any embodiment, may be a difference between, or be a ratio of, the signal and any signal obtained by any other means. For example, a measurement may be used of a first signal, $S'_{C1}$, at location C during firing of cylinder #1 followed by measurement of a second signal, $S_E$, taken at a point E on the shaft part way between locations C and D as shown in FIG. 6B. This second signal $S_E$ might, for example, be near the 180° point in FIG. 4, though it may be anywhere. Then $S_{C1}$ would, in this example, equal $S'_{C1}-S_E$. A similar approach may yield signals $S_{D2}$, $S_{D3}$, and $S_{C4}$, and all four of the signals may then be used in the present, or any other embodiment, to detect roughness or misfire. Note that $S_E$ may be $S'_{D2}$ or $S'_{D3}$ where the latter two symbols represent, respectively, the signals when location D is adjacent the sensor 24 during the #2 and #3 cylinder power strokes.

Further, each of the signals described above or in any other embodiments may be the raw signal output of sensor 24 or any processed version thereof. Particularly, any or all of the signals may have any background components due to inductive coupling, capacitive coupling, electronic biasing, or any other cause subtracted out, filtered out, eliminated via a bridge circuit, or removed by any other means. As would be readily understood by those having skill in the art, the signal may be amplified or phase shifted in any manner as well.

Each of the signals in this or any embodiment may be an instantaneous value, a value integrated over a portion of the shaft rotation, an average value over a portion of shaft rotation, a differentiated value, one or more Fourier components, or a filtered value of the corresponding raw or processed sensor signal. For integrated, averaged, Fourier components, and possibly filtered values, the locations C, D, and E discussed herein may be portions of the shaft rather than discrete points on the circumference. Further, each of the signals may be compared with one other signal, with more than one other signal, or with a combination of other signals, such as an average of a number of other signals for example. For some conditions and for some types of sensor and shaft combinations, any of the signals $S_{C1}$, $S_{D2}$, $S_{D3}$, and $S_{C4}$ may be compared to any of the other signals, to $S_E$, to an average, weighted or otherwise, of any number of the other signals, or to an average (weighted or otherwise) of any number of all the signals to obtain a quantified value indicative of roughness or misfire. Thus, any cylinder may be compared to any other, or to any combination of cylinders, rather than simply the comparisons of #1 to #4 and #2 to #3. Alternately, the signal generated in any cylinder power stroke may be compared directly to a single reference signal, $S_E$, with the quantified value obtained from such comparison used to determine roughness or misfire. In similar manner, each signal $S_{C1}$, $S_{D2}$, $S_{D3}$, or $S_{C4}$ may be compared with its own equivalent reference, $S_{E1}$, $S_{E2}$, $S_{E3}$, and $S_{E4}$ respectively, and the quantified value found from such comparison used to indicate roughness or misfire.

Preferably, the signals to be compared are those generated right after one another in time. Consider, for example, the $S_{C1}$ and $S_{C4}$ comparison described above and illustrated in one possible form in FIG. 7. With the engine operating at 1800 RPM, 15 power strokes of each cylinder would occur each second, that is, 15 $S_{C1}$ signals and 15 $S_{C4}$ signals would be generated each second. Any one or more of these 15 $S_{C1}$ signals may be compared with any one or more of the 15 $S_{C4}$ signals according to the present invention Any one or more of such signals in other (larger) time intervals may also be compared as well. However, a particular $S_{C1}$ signal is preferably compared with the $S_{C4}$ signal immediately following or immediately preceding it.

The timing "trigger" for generating any of the aforementioned signals in this or any embodiment may be activated in a number of ways. As would readily be understood by those having skill in the art, such ways include: monitoring of the ignition system for high voltage or power surges to one or more spark plugs; cam shaft, crankshaft, flywheel, rod, drive shaft, or cylinder position sensing; cylinder pressure sensing; or any combination of the aforementioned ways.

Embodiment 2

A second embodiment of a method according to the present invention entails comparison of any given signal, such as $S_{C1}$ defined in Embodiment 1 above, with one or more earlier measurements of the same signal. For example, a signal such as $S_{C1}$ may be measured once and stored in memory for the duration of two shaft revolutions, that is, until cylinder #1 is in its next power stroke. The signal $S_{C1}$ generated at time=$t_1$ may then be compared with the next $S_{C1}$ signal taken at time=$t_2$ where the time difference $t_2-t_1$ equals the time between power strokes of cylinder #1. If cylinder #1 is firing normally and suddenly burns incompletely or misfires, the misfire will generate a signal $S_{C1}$ significantly less than the previous signal $S_{C1}$. Any comparison scheme, such as those delineated in the description in Embodiment 1 above may be used to obtain a quantified value indicative of the variation between these two signals. When this quantified value exceeds a predetermined threshold, roughness or misfire is indicated. In this way, each cylinder may be monitored continuously for misfire.

The time designations used herein, and in any embodiment, for example $t_1$, $t_2$, etc., may represent periods of time in cases where signal $S_{C1}$ or any of its sibling signals is found by integration, averaging, Fourier analysis, filtering, etc. Further, wherever time designations are referred to herein, the designations coincide with specific locations or regions on the shaft 20. That is, the signal comparisons are typically intended to be made between signals taken at one or more particular locations on the shaft 20, since at different engine speeds, the times at which the signals are taken may be different though the corresponding location on the shaft would be the same.

Any signal may equally as well be compared with any one or more of its preceding values. For example, $S_{C1}$@time=$t_{10}$ may be compared with $S_{C1}$@$t_9$, and/or $S_{C1}$@$t_8$, and/or $S_{C1}$@$t_7$, etc. Wherein the integer subscripts represent the successive occurrences of the power stroke of cylinder #1, for example. Further, $S_{C1}$ may be compared via any statistical means to its own prior values. As would be readily understood by those having skill in the art, other statistical treatment of the data generated may be used in order to detect cylinder roughness or misfire.

For example, a moving average, weighted or otherwise, of the past N number of measurements of $S_{C1}$ may be stored in a computer memory and the average used in comparison with a current value of $S_{C1}$. Similarly, a moving standard deviation of the past N number of measurements of $S_{C1}$ may be used and compared with a current value of $S_{C1}$. If the current value of $S_{C1}$ exceeds a certain number of standard deviations from the average, roughness or misfire may be indicated. The number of standard deviations used to indicate roughness or misfire may be determined by experiment and tailored to the requirements of the particular engine or auto maker. Typical values might be 4.5, 5, 5.5 depending on the accuracy desired and other factors. In addition, more than one such misfire indication might be required in any given number of firings before a misfire warning indication is given as described further below.

A preferred signal processing of this and other embodiments may be direct comparison of two individual signals, either from the same cylinder at different times or from two different cylinders. Nevertheless, the following statistical approach for indicating cylinder misfire has been shown in engine tests to be viable and is shown herein to illustrate one possible way of determining misfire.

The following is an example based upon engine tests of a four cylinder Chrysler 2.2 liter engine illustrating a method for signal processing according to the present invention. $S_{C1}$ is measured on N successive occurrences and the N values are stored in memory. Assume, for example, N=10. The mean value for $S_{C1}$, Mean$S_{C1}$, over the N=10 cycles is calculated and so is the standard deviation $\sigma$. A predetermined multiple of the standard deviation, which by way of example here may be 5.5, is calculated. On the N+1 occurrence (the 11th occurrence in this example) $S_{C1}$ is measured and Mean$S_{C1}$ is subtracted from it to yield $\Delta S_{C1}=S_{C1}-$Mean$S_{C1}$. $\Delta S_{C1}$ is then compared to $5.5\sigma$, and if it exceeds $5.5\sigma$, then misfire is indicated. If no misfire is indicated, the first of the N=10 values of $S_{C1}$ is dropped from memory, the 11th is added, and the mean and standard deviation for the 2nd through 11th occurrences are calculated. The 12th $S_{C1}$ is then measured, and $\Delta S_{C1}$ calculated and compared with 5.5 times the new standard deviation $\sigma$. If $\Delta S_{C1}$ exceeds $5.5\sigma$, then misfire is indicated. If $\Delta S_{C1}$ is not of sufficient magnitude to indicate misfire, the process is repeated—the 2nd measurement of $S_{C1}$ is dropped from memory, the 12th is added, and the process repeats for comparison with the 13th measurement of $S_{C1}$.

If $\Delta S_{C1}$ in this example exceeds $5.5\sigma$ for any measurement of $S_{C1}$, then that value of $S_{C1}$ would typically not be stored in memory as one of the $N=10$ $S_{C1}$ values. This is because it would markedly affect the moving average and the standard deviation which should be reflecting normal firings by a probable misfire value. In such case, the earliest value in memory would not be dropped, and the same $N=10$ $S_{C1}$ values may be retained for the subsequent measurement and comparison with the next value of $S_{C1}$. Alternatively, any value of $S_{C1}$ which leads to misfire indication may be stored and used to calculate the new average and standard deviation. Doing so would be somewhat simpler but may have some adverse effect on accuracy.

Avoiding false alarms is a major aim of car makers. Since even at a threshold of 5.5 standard deviations, a small number of false misfire signals may be produced, several modifications to the above described statistical processing may be performed to minimize the occurrence of false alarms. For example, obtaining a single signal $\Delta S_{C1}$ greater than 5.5 standard deviations may be used to set a possible misfire flag, but not to signal actual misfire. Upon occurrence of two such flags representing two $\Delta S_{C1}$ signals exceeding 5.5 standard deviations in a predetermined number of firings, for example 1,000 cylinder firings, the misfire warning indication may be given. If one flag occurs and a second does not occur for a predetermined number of firings, then the flag counter may be reset to zero. Requiring more than one $\Delta S_{C1}$ signal exceeding a predetermined threshold may decrease the number of false alarms by several orders of magnitude. As would be readily understood by those having skill in the art, other values may be used for thresholds, number of flags, number of cylinder firings to compute the moving average and standard deviation, and number of cylinder firings before the flag is reset to zero.

A further enhancement to improve accuracy and reduce the probability of false alarms is best illustrated by a specific example. If, as described above, 2 misfire flags occur in 1,000 firing events, another flag—a "major" misfire flag may be set rather than indicating misfire directly. Obtaining a predetermined number of major misfire flags over a predetermined time, or predetermined number of firings, or a predetermined mileage may then be required before a misfire warning is indicated. For example, 2 major flags may be required for every one million firing events. If one such major flag occurs and a second does not occur for the one million firing events, then the major flag count may be reset to zero. As a second example, 2 major flags may be required over the entire lifetime of a given vehicle. As would be readily understood by those having skill in the art other values may be used for the number of flags, major flags, and cycles, time, or mileage required for major flags before misfire indication is given.

As a computational aid, the variance $\sigma^2$ may be used instead of the standard deviation $\sigma$. This saves computer time since taking a square root as required to calculate the standard deviation is a fairly lengthy procedure in the time frame of computer processing. Using the example above, $\Delta S_{C1}$ may be squared and compared with $5.5^2\sigma^2$. Therefore, if $(\Delta S_{C1})^2 > (30.25)\sigma^2$, then a misfire flag is set. As a further computational aid, the N changing values of $S_{C1}$ stored in memory do not have to be summed each time an old $S_{C1}$ value is dropped and a new one added. Far fewer computational steps are required by keeping a value in memory which is the sum at any given time of the last N values of $S_{C1}$, then adding the new value of $S_{C1}$ to said sum, subtracting the earliest value of $S_{C1}$, and then storing the result as the new sum of the new set of N values of $S_{C1}$. This entails only two arithmetic operations rather than N, or 10 operations as in the example where $N=10$. The same procedure may be used with the variance. The current variance may be stored in another memory location, the new value of $(\Delta S_{C1})^2$ added to that memory location, the earliest value of $(\Delta S_{C1})^2$ subtracted from that memory location, and the resultant used as the new variance. This reduces the number of arithmetic operations considerably. In the example where $N=10$, ten summing and ten squaring operations are reduced to two summing and two squaring operations. As would be readily understood by those having skill in the art, any cylinder, not merely cylinder #1, may be treated in the manner shown herein.

Embodiment 2 may be combined with Embodiment 1 to form a method of roughness or misfire detection which includes comparison of any given cylinder firing or misfiring with that of any typically normally firing cylinder, as well as a comparison with its own previous typically normally firing event history. Accuracy in roughness or misfire determination may therefore be improved.

Embodiment 3

A third embodiment of the method according to the present invention comprises computation of the percentage of a signal scale, such as full scale of the signal level for each cylinder, and comparison of the percentage computation with similar computations performed for other cylinders.

By way of example, consider the wide variation in measured values for cylinder #1, $S_{C1}$, during the course of the engine lifetime. This variation is due to varying engine torque, varying shaft speed, signal drift with time, temperature variations, long term material property changes through aging, and perhaps other causes. In this example, the onboard computer may store high ($MaxS_{C1}$) and low ($MinS_{C1}$) values for $S_{C1}$ in memory. This may be done by continually updating the high and low values by comparing every $S_{C1}$ measurement to the extrema values in memory and replacing the latter whenever they are exceeded. This updating may be terminated at some point, perhaps some given time or some given mileage or some number of given firings after the first running of the engine, or it may go on indefinitely throughout the lifetime of the engine. Each measurement of $S_{C1}$ is then converted to a percentage or equivalently, a fraction, of the full scale variation, % $S_{C1}$, according to the standard formula % $S_{C1} = (S_{C1} - MinS_{C1})/(MaxS_{C1} - MinS_{C1})$. Similar computations are made for one or more of all other cylinders to obtain % $S_{C1}$, % $S_{D2}$, % $S_{D3}$, and % $S_{C4}$. Typically these values may be computed for every power stroke, and then each of these is compared with one or more or some combination of the others, such as averaging, weighted or otherwise.

For example, as cylinder #1 encounters its power stroke, the percentage of full scale value of cylinder #1, that is % $S_{C1}$, is obtained and followed immediately by the obtaining of similar values for cylinders #3, #4, and #2. % $S_{C1}$ may then be compared directly with % $S_{D2}$ and a quantified value determined, such as $Q_{12} = \%$ $S_{C1}-\% S_{D2}$ which is indicative of the variation between cylinders #1 and #2. Similar comparisons may be made between % $S_{C1}$ and % $S_{D3}$ and % $S_{C4}$ to yield quantified values $Q_{13}$, $Q_{14}$; and, indeed, between any two cylinders with additional associated quantified values $Q_{23}$, $Q_{24}$, and $Q_{34}$. As in other embodiments, if the quantified value exceeds a predetermined threshold value, roughness or misfire is indicated. In this way any given cylinder power stroke may be compared with any other, or with any combination of others, in a manner that renders negligible the non-torque induced differences in signals generated from different locations on the shaft 20.

% $S_{C1}$ or any of its sibling signals may also or instead be compared with some average, weighted or otherwise, of the percentage value from one or more other cylinders or with a predetermined constant value. By way of example, % $S_{C1}$ may be compared with % $S_{234}=(\% S_{D2}+\% S_{D3}+\% S_{C4})/3$ to obtain quantified value $Q_{1,234}=\% S_{C1}-\% S_{234}$. As a second example, % $S_{C1}$ may be compared directly with a suitable predetermined constant value, K, to obtain a quantified value $Q_{1,K}=\% S_{C1}-K$. If $Q_{1,K}$ exceeds a predetermined threshold, roughness or misfire is indicated. As would be readily understood by those having skill in the art, many other schemes are possible for calculating percentage variation in a signal generated by the various cylinders and for comparing the various percentage variations.

For example, instead of defining % $S_{C1}$ as the percentage of full scale signal as shown above, it may also be defined in a number of other effective ways, generically represented as % $S_{C1}=(S_{C1}-{}_MS_{C1})/({}_NS_{C1}-{}_PS_{C1})$ where ${}_MS_{C1}$, ${}_NS_{C1}$, and ${}_PS_{C1}$ are any suitable values of zero; $S_E$; $S_{C1}$; $S_{D2}$; $S_{D3}$; $S_{C4}$; constant values; or any other suitable values. $S_{C1}$, $S_{D2}$, $S_{D3}$, and $S_{C4}$ values may be maximum, minimum or mean values. Similar logic applies to definitions for % $S_{D2}$, % $S_{D3}$, and % $S_{C4}$.

Further, the method described in this particular embodiment may be used to provide a relative, not absolute, indication of engine torque for use in electronic engine control systems. To see how this can be done, consider the example discussed above in which % $S_{C1}$ represents the percentage of full scale signal generated by cylinder #1 during its power stroke. By taking the $MaxS_{C1}$ and $MinS_{C1}$ signals stored in memory as permanently fixed at some point, that is, they are not continually updated throughout the lifetime of the engine, the % $S_{C1}$ level thereby becomes proportional to the amount of torque produced during the cylinder #1 power stroke. Using the four % $S_{C1}$, % $S_{D2}$, % $S_{D3}$, % $S_{C4}$ values collectively a quantitative value may be obtained, such as by adding or averaging (weighted or otherwise), which is proportional to the mean engine torque being produced over a predetermined number of shaft rotations. This quantitative value may thereby be used as an input to electronic engine control systems in a very advantageous manner. In general this quantitative value will be a relative rather than absolute value of torque. That is, it will be a signal level relative to some maximum and some minimum generated by the engine at some prior time. Without knowledge of the exact magnitudes of the earlier maximum and minimum torques, the precise torque represented by the signal level at the present time cannot be known, and hence the signal level would only be a relative indicator of torque.

However, with some means for determining the actual values of torque when the earlier maximum and minimum values were generated, the signal level may then be calibrated and correlated directly with actual torque. In this case, the method described herein may yield an accurate torque indication. Even without this direct correlation, however, the relative torque indication may prove useful for engine control systems, diagnostics, and other practical applications.

Embodiment 4

Embodiment 4 incorporates the method steps discussed in Embodiment 3 to obtain a signal related to the degree of cylinder combustion, but makes a quantitative comparison between successive signals, at least two of which, are from the same cylinder rather than solely between different cylinders.

For example, the value of % $S_{C1}$ as defined in Embodiment 3 above, obtained in one power stroke of cylinder #1 may be stored in memory. The very next measurement of % $S_{C1}$ from the next power stroke of cylinder #1 may then be compared with it. Any significant deviation of one such signal measurement from the previous measurement indicates a sudden occurrence of roughness or misfire.

As described above in Embodiment 2, any measurement of % $S_{C1}$ may be compared with any previous measurement of % $S_{C1}$, % $S_{D2}$, % $S_{D3}$, % $S_{C4}$, or with any combination of previous measurements, such as moving averages, standard deviations, or variances. Signals may represent instantaneous values, average values, integrated values, one or more Fourier component values, filtered values, or other suitable value. Further, the variations from the moving average of each of the signals % $S_{C1}$, % $S_{D2}$, % $S_{D3}$, and % $S_{C4}$ may be quantified by difference, ratio, % change, or any other means and then compared to one another or to a mean value of the variations from the moving averages of more than one cylinder and used as an indicator of roughness or misfire. As an example, this may be done by comparing a given signal variation from the average with a multiple of the standard deviation obtained from a composite of other signals. This is similar to the method of the example described in Embodiment 2, and it is further illustrated with the following specific example.

For two predetermined revolutions of the shaft 20, the four signals % $S_{C1}$, % $S_{D2}$, % $S_{D3}$, and % $S_{C4}$ are obtained, and an average (Mean % S) and standard deviation (% $\sigma$) are calculated from those four signals. The first signal on the next revolution of the shaft 20 is a new % $S_{C1}$. Similar to the method of Embodiment 2, the difference between the new % $S_{C1}$ and Mean % S is found, $\Delta\% S = \% S_{C1} -$ Mean % S. This difference $\Delta\%$ S is then compared with a multiple of the standard deviation to determine whether misfire should be indicated or a misfire flag set. For example, using 5.5 as the multiple, if $\Delta\% S > 5.5(\% \sigma)$, then misfire, or a misfire flag, is indicated. If no misfire, or misfire flag, is indicated, then the first value of % $S_{C1}$ is dropped from memory, the current value added, and a new average signal (Mean % S) and new standard deviation (% $\sigma$) are calculated. These are then used in similar manner with the next measurement of a cylinder event, % $S_{D3}$, to check for misfire, or misfire flag, in the next cylinder, cylinder #3.

Other variations of this embodiment include taking more than a single prior cylinder event for each cylinder in calculating a moving average and a standard deviation. For example, 4 shaft revolutions and 2 signals from each cylinder may be taken rather than 2 shaft revolutions and 1 signal from each. Any number of prior events may be taken which yields accurate misfire indication. Further, all of the variations on this theme as described in Embodiment 2 are equally applicable in this embodiment. As examples, variance may be used instead of standard deviation and any number of flags or any values for other parameters may be employed. And as with Embodiments 1 and 2, Embodiments 3 and 4 may be combined to provide an indicator of roughness or misfire.

Embodiment 5

Figure 8A:
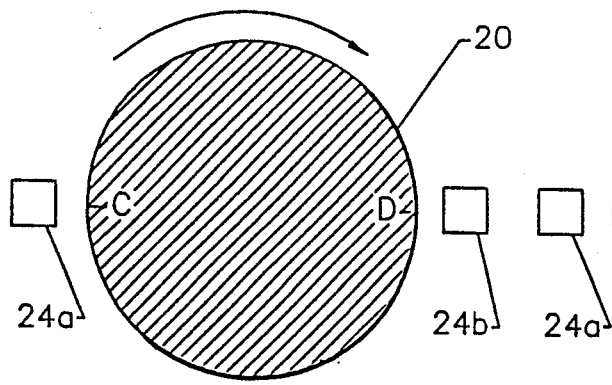
FIGS. 8A-8B are schematic diagrams depicting misfire or roughness sensing during rotation of an engine crankshaft in a method according to the present invention incorporating multiple sensors.
Figure 8B:
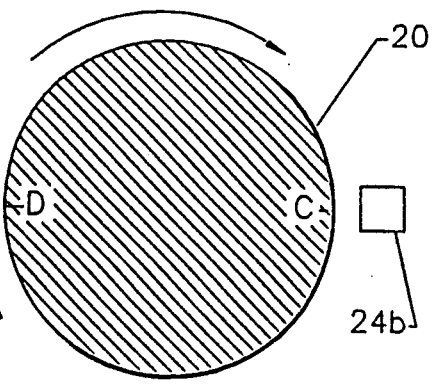

FIG. 8 illustrates the fifth embodiment of the invention in which two sensors 24 are spaced at effectively 180° apart from one another around the shaft 20. The signals from each sensor are combined, typically by adding. The resultant signal from the combination is used to compare the relative cylinder power strokes using methods described in previous embodiments. The symmetry of this embodiment is evidenced by comparing the shaft 20 to sensor 24 alignment in FIG. 8A when cylinder #1 is in its power stoke to that of FIG. 8B, half a shaft revolution later, when cylinder #3 is in its power stoke. By adding the signals from each of the two sensors 24, the effect on the resultant signal from variations in shaft material permeability tensor is effectively eliminated. Hence, cylinder #1 may be compared directly with cylinder #3.

This method of combining signals has several advantages including elimination of possible signal variations from shaft misalignment, wobble, vibration, or bending; doubling the signal strength; and permitting direct comparison of any single cylinder power stroke to any other, to any number of others, or to any combination of others, including averaging. Any given signal from any given cylinder may also be compared with the signal, or signals or combination of signals, from an earlier power stroke of the same cylinder in a manner similar to that described in Embodiments 2 and 4. Also, any of the methods described in any other embodiments having a single sensor 24, may be used in this embodiment as well.

As would be readily understood by those having skill in the art, for six cylinder engines, three sensors may be employed at equal spacings around the shaft and used in similar manner to that described herein for four cylinder engines. As would be also be readily understood by those having skill in the art, multiple sensors may be extended to engines of any number of cylinders. Four or more sensors may also be situated around the shaft at effectively equal angular spacings and their signals combined, compared, and utilized in the same manner as configurations employing fewer sensors.

Embodiment 6

Figures 9A, 9B:
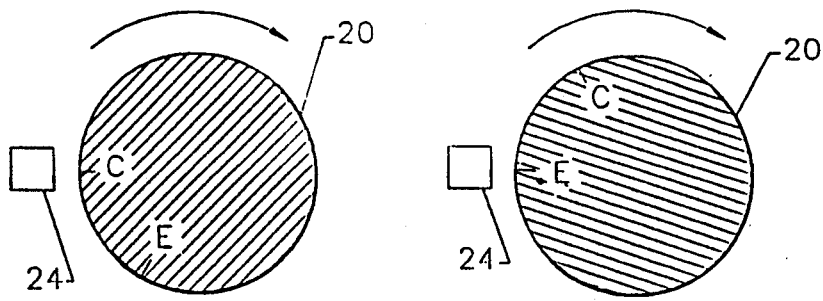
FIGS. 9A-9B are schematic diagrams depicting misfire or roughness sensing during rotation of an engine crankshaft in a method according to the present invention.

FIG. 9A shows location C under the sensor 24 with cylinder #1 in its power stroke. In FIG. 9B, location E on the shaft 20 is under the sensor 24. Location E may be anywhere on the shaft 20 though typically it is at a position on the shaft where the torsional strain produced in the shaft is considerably less than that at location C.

This embodiment uses % $S_{C1}$, defined as the percentage or fraction that $S_{C1}$ represents of some signal scale, such as full scale as shown in Embodiment 3 above. That is, % $S_{C1} = (S_{C1} - {_M}S_{C1})/({_N}S_{C1} - {_P}S_{C1})$ where ${_M}S_{C1}$, ${_N}S_{C1}$, and ${_P}S_{C1}$ are any suitable values of zero; $S_E$; $S_{C1}$; $S_{D2}$; $S_{D3}$; $S_{C4}$; constant values: or any other suitable values. $S_{C1}$, $S_{D2}$, $S_{D3}$, and $S_{C4}$ values may be maximum, minimum or mean values. Similar logic applies to definitions for % $S_{D2}$, % $S_{D3}$, and % $S_{C4}$.

For simplicity of illustration, assume that ${_M}S_{C1} = {_P}S_{C1} = \text{Min}S_{C1}$, and ${_N}S_{C1} = \text{Max}S_{C1}$, where the symbols for maximum and minimum levels of $S_{C1}$ correspond to those of Embodiment 3, and where the measurement or determination of those maximum and minimum levels may be by any one of the methods described in Embodiment 3 or other methods as would be readily understood by those having skill in the art. In this illustration % $S_{C1}$ typically ranges from zero to 1.0, and equals the percentage of the full scale signal range that $S_{C1}$ represents during any given firing or misfiring event of cylinder #1. $S_E$ and % $S_E$ may be defined in parallel manner to $S_{C1}$ and % $S_{C1}$. In the present illustration, % $S_E$ would therefore represent the percentage of full scale signal that $S_E$ is at any given time.

% $S_{C1}$ is then compared to % $S_E$ in a manner similar to like comparisons made between signals in earlier embodiments. One such comparison method is simple subtraction wherein a quantified value $Q_{C1,E} = \% S_{C1} - \% S_E$ is obtained indicative of the difference in stress/strain/deflection level in the shaft 20 between measurements of $S_{C1}$ and $S_E$. For proper cylinder firing, $Q_{C1,E}$ would have a certain value or range of values. For misfire, $Q_{C1,E}$ would fall outside of such a range and be an indicator of lack of combustion in the cylinder.

Similar logic applies to the definitions and use of % $S_{D2}$, % $S_{D3}$, and % $S_{C4}$; and to the obtaining of quantified values for each $Q_{D2,F}$, $Q_{D3,G}$, and $Q_{C4,H}$ where the F, G, and H refer to locations similar to E. Any of locations E, F, G, and H may be identical to any of the others. Hence, the methods shown herein above or below are equally as applicable to any cylinder in any engine not merely to cylinder #1.

Further, the present embodiment may be used in conjunction with or incorporating the logic of any combination of other embodiments. For example, $Q_{C1,E}$ for any given power stroke of cylinder #1 may be compared with the previous $Q_{C1,E}$ of the previous power stroke of cylinder #1, or to any previous $Q_{C1,E}$ from any previous power stroke, or to some combination, such as a moving average of previous power stroke $Q_{C1,E}$ values. In addition, $Q_{C1,E}$ may be further, or instead, compared with any one or more or combination of $Q_{C4,H}$, $Q_{D2,F}$, $Q_{D3,G}$ via any method, such as those methods described in Embodiment 3 for the comparison of % $S_{C1}$ with % $S_{D2}$, % $S_{D3}$, or % $S_{C4}$.

Since the signal at location E may be of limited range, a particular variation of this embodiment might compare $S_{C1}$ directly with $S_E$. One possible method for such comparison is subtraction, and note that with ${_N}S_{C1} = {_P}S_{C1} = 0$, and ${_N}S_{C1} = 1.0$, then % $S_{C1} = S_{C1}$ and % $S_E = S_E$. Hence, quantified value $Q_{C1,E} = S_{C1} - S_E$ in this case.

As in other embodiments, locations C and E in this embodiment may be regions rather than points on the shaft, and the signal may be other than of an instantaneous nature. For example, the signal may be an integrated value, a summed value of a number of instantaneous values, a filtered value, one or more Fourier component values, etc. Preferably location or region C passes under the sensor 24 during the power stroke of cylinder #1, as in other embodiments. As would be readily understood by those skilled in the art, this is not necessary if ramifications from the power stroke of cylinder #1 may be sensed by the sensor 24 during other strokes of cylinder #1.

As would be readily understood by those having skill in the art, other methods which compare a signal at C to one at E to determine roughness or misfire or relative contributions to engine torque are possible in this embodiment.

Embodiment 7

Figures 10A, 10B:
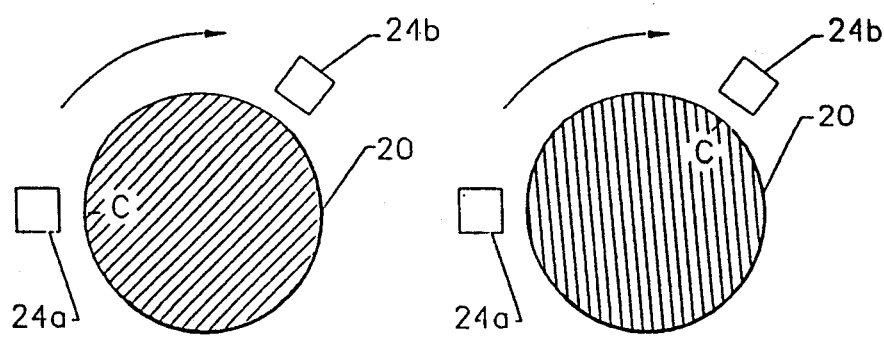
FIGS. 10A-10B are schematic diagrams depicting misfire or roughness sensing during rotation of an engine crankshaft in a method according to the present invention incorporating multiple sensors.

FIGS. 10A–10B show one possible configuration for Embodiment 7. In FIG. 10, two sensors 24a, 24b are situated at different locations around the shaft 20. In FIG. 10A, location C is under sensor 24a and the stress/strain/deflection of the shaft 20 is at or near its maximum level for the case of normal cylinder firing. In FIG. 10B, location C has moved under sensor 24b, and the stress/strain/deflection of the shaft 20 is at or near a minimum level or at the least, a level less than that of FIG. 10A.

The sensors 24a, 24b are effectively identical in function, that is, both sensors 24a, 24b will produce effectively equal signals responsive to measuring a predetermined location on the shaft experiencing an identical stress/strain state. Hence, any effective difference in signals from a predetermined shaft location is indicative of a difference in stress/strain/deflection in the shaft 20. Comparison of the signal from the first sensor 24a in FIG. 10A with that from the second sensor 24b in FIG. 10B yields a quantified value that may be related to the degree of combustion in any given cylinder. As provided in other embodiments, there are a number of ways to obtain this quantified value. The following is one example of determination of a suitable quantified value, and its use in indicating cylinder performance. As would be readily understood by those having skill in the art, the example is only illustrative.

To illustrate one mode for the embodiment, take $S_{Ca}$ as the signal generated by the first sensor 24a in FIG. 10A, and $S_{Cb}$ as the signal generated by the second sensor 24b in FIG. 10B. Assume a definition of the quantified value when cylinder #1 fires as $Q1_C = S_{Ca} - S_{Cb}$. Each time cylinder #1 fires, $Q1_C$ will have a certain value. When cylinder #4 fires one shaft revolution later, $Q4_C$ should have essentially the same value assuming both cylinders #1 and #4 fire normally. Any variation between $Q1_C$ and $Q4_C$ indicates a variation in combustion efficiency between the two cylinder power strokes. One means for determining this variation is by subtraction, and hence for $X_C = Q1_C - Q4_C$ (where $X_C$ is considered a "contrasted value", contrasting the two quantified values), any $X_C$ greater than a threshold value may indicate roughness or misfire in cylinder #1. Any negative value of $X_C$ below a threshold value may indicate roughness or misfire in cylinder #4. Similar arguments hold for cylinders #2 and #3.

Any given quantified value for any given power stroke may be compared with its own value on the previous power stroke of the same cylinder or with some combination, such as a moving average, of its own previous values to indicate the condition of cylinder functioning in the given power stroke. This follows in parallel with Embodiments 2 and 4.

In addition, the method of the present embodiment may be incorporated with that of Embodiment 3 to yield a percentage of full, or some other, scale quantified value in order to compare power stroke performance between any two or more cylinders. All of the methods outlined in other embodiments are directly applicable here.

For instance, $Q1_C$ may be defined in a number of effective ways, generically represented as $Q1_C = (S_{Ca} - {}_MS_{C1})/({}_NS_{C1} - {}_PS_{C1})$ where ${}_MS_{C1}$, ${}_NS_{C1}$, and ${}_PS_{C1}$ are any suitable values of zero, or $S_{Cb}$ including $MaxS_{Cb}$, $MinS_{Cb}$, or mean values of $S_{Cb}$ or $S_{Ca}$ including $MaxS_{Ca}$, $MinS_{Ca}$, or mean values of $S_{Ca}$, or $S_{D2}$, or $S_{D3}$, or $S_{C4}$ where the latter three include, maximum, minimum, and mean values, or constant values, or any other suitable values. Similar logic applies to definitions of $Q2_D$, $Q3_D$, and $Q4_C$. Any of $Q1_C$, $Q2_D$, $Q3_D$, or $Q4_C$ may then be compared with any others or any combination of others, statistical or otherwise, to indicate cylinder power stroke performance of any cylinder.

Neither this embodiment nor any others is limited to any particular statistical treatment of the data generated in order to detect cylinder malfunction. As one of many possible such statistical approaches, this embodiment may be treated in a manner similar to that described in the statistical example of Embodiment 2 wherein moving averages and moving standard deviations are employed and roughness or misfire is indicated when a signal exceeds a certain number of standard deviations.

Further, the variations from the moving average or the moving standard deviation of each of the signals $S_{C1}$, $S_{D2}$, $S_{D3}$, and $S_{C4}$ (quantified by difference, ratio, % change, or any other means) may be compared to one another or to a mean value of the variations from the moving averages of more than one cylinder and used as an indicator of roughness or misfire as well.

The locations of the two sensors 24a, 24b are not constricted in any way to any particular regions of the shaft 20 as would be readily understood by those having skill in the art. Further, the points in the various cylinder strokes at which signals are measured and compared are not constrained in any way to the example shown in this embodiment, and other suitable measurement points are possible as would be readily understood by those having skill in the art. In other possible embodiments, more than two sensors may used in similar fashion as that shown in Embodiment 7 to the same end.

Embodiment 8

Figures 11A, 11B:
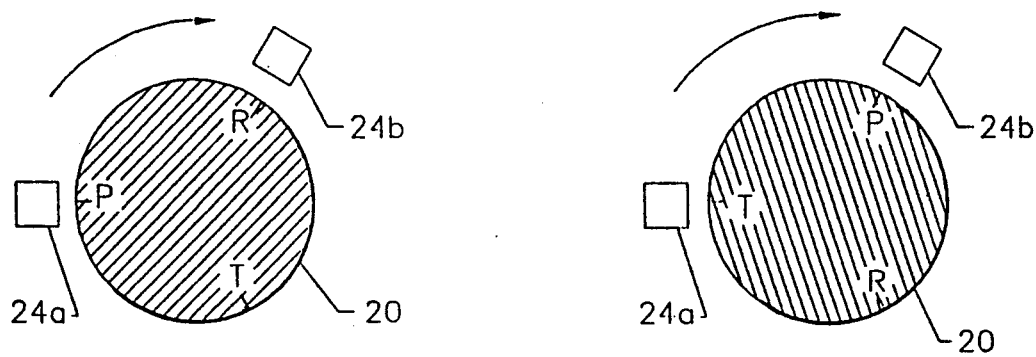
Figure 11C:
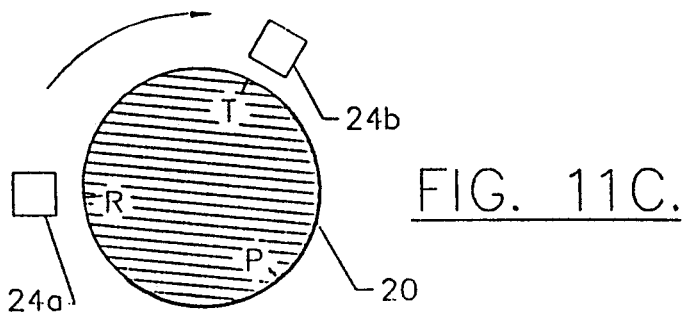

FIGS. 11A–11C shows another embodiment of the invention which is applicable to six cylinder engines. In this embodiment two sensors 24a, 24b are used in a way which permits direct comparison of sensor signals between any two of the six cylinder power strokes.

To illustrate the embodiment, assume a firing order of cylinder numbers 1-2-3-4-5-6. In FIG. 11A, cylinder #1 is in its power stroke; in FIG. 11B, cylinder #2; in FIG. 11C, cylinder #3. Locations P, R, and T are used in similar fashion to the locations C, D, and E of other embodiments. The sequence shown is immediately followed by a similar one in which FIGS. 11A, 11B, and 11C may represent successive firings of cylinders 4, 5, and 6. For simplicity, the focus is on the 1-2-3 sequence and an extrapolation is then made to all six cylinders.

Sensors 24a, 24b are essentially identical in function. In other words, identical stress/strain states of shaft regions with identical properties will yield effectively identical signals in both sensors 24a, 24b. Hence, if the shaft 20 is carrying identical stress then the signal from the first sensor 24a when cylinder #1 is firing (FIG.

11A) is effectively identical to the signal for the second sensor 24b when cylinder #2 is firing (FIG. 11B.) Hence, representing the signal from the first sensor 24a when cylinder #1 is firing as $S_{1,P}$ and that from the second sensor 24b when cylinder #2 is firing as $S_{2,P}$, a comparison between firings of cylinders #1 and #2 may be made. A significant difference between the two signals indicates roughness. A greater difference indicates misfire.

As in other embodiments, the comparison between the two signals may be made in any number of ways, but for simplicity subtraction is illustrated. Hence a quantified value $Q_{12,P} = S_{1,P} - S_{2,P}$ is obtained which compares the successive firings, or any predetermined non-successive firings, of cylinders #1 and #2. As in other embodiments, any significantly non-zero value of $Q_{12,P}$ indicates roughness. A significantly larger variation from zero indicates misfire. In similar fashion, from FIGS. 11B and 11C it is shown that a similar quantified value $Q_{23,T} = S_{2,T} - S_{3,T}$ may be obtained and cylinder #2 compared with #3. Continuing such logic for FIGS. 11C and 11A, cylinders #3 and #1 may also be compared via quantified value $Q_{31,R}$.

Extrapolating, cylinders #1 to #4 may be compared in a similar manner, since both cylinders fire when the shaft sensors are configured as shown in FIG. 11A. Quantified values $Q_{14,P} = S_{1,P} - S_{4,P}$ and $Q_{14,R} = S_{1,R} - S_{4,R}$ reflect this comparison. Hence, using the comparisons between #1 to #2 cylinders conjointly with the comparisons between #1 and #4 cylinders, cylinders #2 and #4 may be compared. Alternatively, quantified value $Q_{24,P} = S_{2,P} - S_{4,P}$ may be found directly to compare cylinder #2 to #4. Repeating this approach for all other cylinder combinations leads to direct comparison of any cylinder to any other. Therefore, any rough or misfiring cylinder may be immediately detected.

As would be readily understood by those having skill in the art, many variations exist on this theme and any other embodiments may be used along with this embodiment. For example, percentage range signals may be calculated and utilized in a manner similar to that described for other embodiments. So may comparisons of prior firings of the same cylinder or of moving averages of one or more cylinders. As another example, embodiments 7 and 8 may be used conjointly. Further, the method may be extended to engines of eight or any other number of cylinders. This embodiment may use any method or means which uses two or more sensors to allow direct comparison of any two cylinder firing or non-firing events to one another.

Embodiment 9

FIG. 16 shows a schematic diagram of an apparatus 60 for detecting engine misfire or roughness. A microprocessor 61 operating under stored program control may be used to process the signals generated from the sensor 24 which may typically be positioned adjacent a power transmitting member, such as a shaft 20, coupled to the engine cylinders 62. The cylinders are coupled to a flywheel 63 which in turn is usually coupled to a load 65, such as the driving wheels, via a transmission 64. A timing trigger sensor 66, such as a Hall effect or magnetic pickup sensor, may be used to generate timing signals for the microprocessor 61 based upon rotation of the flywheel 63. The particular cylinder which is intended to be firing may be identified by a camshaft position sensor 68 positioned adjacent to the engine camshaft 67.

While the sensor(s) 24 may be located anywhere circumferentially or longitudinally along the shaft 20, this embodiment relates to a specific location of the sensor(s) for automotive or other internal combustion engines containing a main bearing or other bearings. FIG. 12 shows one such configuration in which a section is cut out of the main bearing cap 50, and the sensor 24 is located inside the cutout section. If needed, a section is also cut out of the bearing sleeve 52 to permit the sensor 24 to be closer to the shaft. Sensor leads 54 are routed through any appropriate slots or holes in the bearing cap 50, and the sensor 24 itself may be in any suitable location or position within the bearing cap 50. Such a configuration has the advantage that no fundamental redesign of the engine or other engine compartment components and spacing is needed to facilitate implementation of the sensor 24 into the engine.

Embodiment 9 may use any type of sensor including magnetostrictive sensors of all types and is not limited to a particular type of magnetostrictive sensor. As would be readily understood by those having skill in the art, other sensors may also be used. Applicants have performed successful experimentation with the cross design sensor shown in FIG. 2 and installed in a bearing cap. Various sensor drive configurations, such as constant amplitude voltage, constant amplitude current, and constant amplitude flux (see U.S. Pat. No. 4,939,937) have been used at resonance, above resonance, and below resonance. In addition, the "single branch" magnetostrictive sensor designs shown in FIGS. 3A and 3B are suitable and may be used with any of the aforementioned drive and resonance or non-resonance conditions. Of course, any "multiple branch", solenoidal, or other design magnetostrictive sensor may be used in any of their respective various forms.

The sensor(s) 24 may also be installed in the engine block portion of the bearing or in any other bearing or at any other location along the crankshaft or driveshaft. For example, on typical automobile engines, the sensor(s) 24 may be placed on the front end opposite the drive shaft end of the engine. In such case, a shaft on the front end might be constructed of a less structurally torsion resistant member, such as a hollow shaft, since the loads are significantly less. Also, the location, longitudinally, circumferentially, and radially, of the cutout and sensor 24 in the bearing cap 50 or the bearing sleeve 52 (FIG. 12) may be anywhere suitable to proper operation of the sensor.

Embodiment 10

In another embodiment according to the invention, signals generated by successive firing events may be subtracted and the value obtained from such subtraction used as a first signal. A second signal may then be obtained in a similar manner by subtracting two other signals generated by successive firing events. The second signal is then compared with the first signal to indicate roughness or misfire. For example, if $t_1S_{C1}$ is a signal generated by a firing event at time t1 from a given cylinder and $t_2S_{C1}$ is the signal generated by the very next firing event from the same cylinder at time t2, then $_1T_{C1} = {}_{t2}S_{C1} - {}_{t1}S_{C1}$ is the first signal described above. Similarly, the second signal is then $_2T_{C1} = {}_{t3}S_{C1} - {}_{t2}S_{C1}$. In general the nth such signal is $_nT_{C1} = {}_{tn+1}S_{C1} - {}_{tn}S_{C1}$. A quantified value comparing the second signal to the first via subtraction is then $Q_{TC} = {}_2T_{C1} - {}_1T_{C1}$ and in general the nth such quantified value is $_nQ_{TC} = {}_{n+1}T_{C1} - {}_nT_{C1}$. The signals represented herein as $T_{C1}$ parallel those designated by $S_{C1}$ in other embodiments and the invention comprises the use of the signals $T_{C1}$ in lieu of $S_{C1}$ in all other possible embodiments.

Alternatively, the quantified value $_nQ_{TC}$ may be defined by comparing the most recent value of $T_{C1}$ to an average, weighted or otherwise, of prior values of $T_{C1}$. For comparison via subtraction, the nth quantified value may then be defined as $$_nQ_{TC} = {}_{n+1}T_{C1} - (1/n) \sum_{i=1}^{n} {}_iT_{C1}.$$

Throughout all embodiments, $T_{C1}$, or in general, $_nT_{C1}$, may be used in lieu of $S_{C1}$ and $Q_{TC}$ or in general, $_nQ_{TC}$, in lieu of any quantified values. Similar logic applies to other cylinders and to comparisons between different cylinders as shown in discussions of other embodiments. This embodiment may serve to minimize the effect of undesirable variation in a signal during severe transient operating conditions and thereby enhance detection of misfire or roughness.

A Preferred Mode of the Invention

Tests have been conducted by applicants using a magnetostrictive sensor 24 installed in the main bearing cap 50 of a test cell engine. The bearing cap 50 was made of stainless steel although in alternate configurations it could be of ceramic, or other non-ferromagnetic material. It may also be made of any typical ferromagnetic material used by automakers for bearing caps, such as cast iron or steel or any other material. Signal strength due to straying of magnetic fields might be reduced somewhat by placing the sensor in a ferromagnetic bearing cap 50.

The sensor 24 used in the test was a cross design magnetostrictive sensor (FIG. 2) driven at a frequency of about 50 Khz, although other diving frequencies may be used. The drive circuit includes a capacitor (not shown) which along with the inductive nature of the coil and the resistance in the circuit, gives the drive circuit a natural resonant frequency. The circuit was driven by a constant amplitude voltage at a frequency at or close to the natural frequency of the circuit—about 50 Khz in the test. This natural frequency may be varied and may be chosen as desired by varying the resistance, capacitance, and inductance of the circuit as would be readily understood by those having skill in the art. Driving at or near resonance provides at least two advantages. The first advantage is that the imaginary component of the impedance may be minimized or even eliminated, thereby maximizing current $i_P$, magnetic flux, and sensor output sensitivity and minimizing power and drive voltage level requirements. The second advantage is that effects from shaft RPM which introduce a speed dependent component to the output signal are minimized or eliminated. It is also possible to drive, at resonance, a constant amplitude current $i_P$ with the capacitor in parallel rather than series and obtain similar benefits.

As an alternative, a single branch magnetostrictive sensor (FIGS. 3A and 3B) may be used. For example, the sensor shown in FIG. 3A with a pickup coil, driver coil, and a drive circuit similar to that described in the previous paragraph may be used. That is, an RCL circuit may be used, operated at or near resonance. A sensor as shown in FIG. 3B may also be used wherein the single coil serves as both a driver and a pickup coil. For this sensor, either constant amplitude driving voltage is used and the change in current used to indicate changes in stress/strain state of the shaft 20, or constant amplitude current is used and the change in voltage is used to indicate changes in stress/strain of the shaft 20. As would be readily understood by those having skill in the art, a single branch, cross, or other type magnetostrictive sensor may be used at, near, or off resonance. FIG. 17 shows a dual branch magnetostrictive sensor as known in the prior art.

The sensor used in the test had cores constructed out of laminated ferromagnetic material as may typically be used for such applications. An alternative material is ferrite, also typically used in such applications. The sensor housing was made of plastic in one series of tests and of ceramic (Macor) in another series. Other suitable materials for housing, cores, wiring, etc. may be used as would be readily understood by those having skill in the art.

FIG. 14 illustrates the mode of signal processing employed in the tests. A raw analog signal W is generated by the magnetostrictive sensor in the test configuration. That signal W may then be amplified by an amplifier 110 to yield an amplified signal X. Note that both signals W and X are high frequency oscillations, about 50 Khz in this example, the outermost bounds of which form an envelope N. The amplified signal X is then rectified, such as full wave rectified, by rectifier 112 to yield the rectified signal Y. The rectified signal Y is then passed through a low pass filter 114 which is designed to cut out the high frequency (around 50 KHz) components of rectified signal Y and leave the signal Z whose shape parallels the envelope N. Signal Z is then passed through a high pass filter 116 which is designed so that it is little more than a DC eliminator. That is, high pass filter 116 lets any frequency components typically greater than around 0.01 Hz through to yield final analog signal F. Final analog signal F is effectively signal Z with the DC component removed, that is, the average value of analog signal F is zero. As would be readily understood by those having skill in the art, a single band pass filter with high and low frequency limits respectively set to those of high pass filter 116 and low pass filter 114 may be used in lieu of the separate high pass 116 and lowpass 114 filters.

FIG. 15 helps illustrate the digitization method employed in the test to sample the final analog signal F and produce a suitable digital signal. In the test, a cam shaft sensor was used to indicate position of the distributor cam shaft and hence indicate which cylinder was in its power stroke. In addition, a flywheel sensor was used to detect the particular location on the shaft 20 passing under the sensor 24. (See FIGS. 6-11). The flywheel sensor was a Hall effect sensor which produced a signal spike H each time a flywheel tooth passed the Hall effect sensor as shown in the plot of H over the angular location of the crankshaft as shown in FIG. 15. The final analog signal F was then sampled each time a pulse was received from the Hall effect sensor. In processing the resulting digital signals $G_i$ it was determined that greater accuracy resulted from sampling from two regions on the shaft represented by $G_i$ and $G_j$ corresponding to the torque peaks shown in FIG. 13. The first torque peak, which for any given cylinder power stroke typically occurs in the first half of the power stroke, is due to the pressure developed during combustion in the cylinder. The second torque peak is due to inertial factors and is the indirect result of the same combustion event.

In the test, n samples of F, that is, $G_i$ where $i=1,n$, were taken corresponding to the region of the first torque peak, and m samples of F, that is, $G_j$ where $j=1,m$, were taken corresponding to the region of the second torque peak. Since, in the test, cylinder #1 was the cylinder intentionally being misfired, the signal of interest is designated in this example as $S_{C1}$, and the signal $S_{C1}$ corresponds to the signal designated $S_{C1}$ in all previous discussion of other embodiments. $S_{C1}$ was found simply by adding all values of $G_i$ and $G_j$. That is $$\sum_{i=1}^{n} G_i + \sum_{j=1}^{m} G_j = S_{C1}$$

In similar fashion, $S_{D2}$, $S_{D3}$, $S_{C4}$ signals were found for the other cylinders. These four signals $S_{C1}$, $S_{D2}$, $S_{D3}$, and $S_{C4}$ may then be processed in any of the manners discussed in the embodiments described herein or in any other manner to monitor and determine a number of engine parameters. Attention in the tests was on misfire detection. In the particular tests and signal processing referenced herein, Embodiment 2 consisting of comparing $S_{C1}$ to a moving average and moving standard deviation of a series of prior $S_{C1}$ signals has been investigated and found to accurately detect misfire.

The summation points corresponding above to the spikes on the graph of H versus the location on the shaft 20 may be expanded to include additional points lying between the spikes shown in FIG. 15. Accuracy may be improved by so doing and the summation may then become a good approximation of an analog integration of the final analog signal F.

Analog integration over the regions of the shaft where the torque peaks or even over larger regions, including the region corresponding to the entire power stroke, may be done instead of the sum of digital values $G_i$ and $G_j$ as shown above. This may be carried out with appropriate circuits including one or more capacitors in order to integrate the final analog signal F. In such an application, $$\int F ds = S_{C1}$$

where the integration is carried out over a suitable region of the shaft 20 and the differential quantity "ds" in the integrand represents an infinitesimal region on the shaft 20.

Alternatively, the integration may be performed over time rather than shaft location, and in fact an integration over time is more suited to the analog circuits typically used to perform analog integration. However, the resultant of the integration would typically be modified to correct for differences in the speed of the shaft 20. For example, if the shaft 20 were moving at one speed for one integration and a second speed, twice that of the first, for a second integration, then for consistency in comparison, the integration of the second case would have to occur for half of the time of the first. In addition appropriate starting and ending times of the integration would have to be adjusted to account for the variation in shaft speed. The flywheel sensor may also be used to advantage in such case, by determining shaft speed and triggering the initial and final starting points for the integration.

When integration is performed over time and even though the time periods of integration are adjusted to correspond to the same shaft locations, the final result of the integration must be modified further to account for the variation in the length of time over which the integration is carried out. Hence if in the second case above, the RPM is twice that of the first case, then the integral in the second case was carried out over half of the time. Hence the integral in the second case must be multiplied by two in order to compare it to that of the first case. A simple way to carry out this adjustment entails multiplying the result of each integration by the RPM of the shaft or equivalently dividing by a time inversely proportional to the RPM, such as the time between spikes generated by the flywheel sensor or the time of integration. Mathematically, this can be expressed as $$(RPM) \cdot \int F dt = S_{C1}$$

or alternatively, as $$(1/T) \cdot \int F dt = S_{C1}.$$

Advantages Over Prior Art

This invention may thus be seen to solve the problems delineated in the "Background of the Invention" section in a simple, novel, and practical manner. While the above descriptions contain many specific examples, these should not be construed as limitations on the scope of the invention, but merely as exemplifications of preferred embodiments. Those skilled in the art will envision many other possibilities that are within its scope. For example, any of the embodiments may use any type of sensor(s) of any shape, size, or materials. Further, wherever the term "shaft" is used, any torque transmitting member is intended, and the member may be of any material, size, or shape and may even be a torque disk, such as shown in U.S. Pat. No. 4,697,460. The torque transmitting shaft may be coated with any material, such as plasma sprayed material, amorphous bonded strips, thin films, etc. The surface of the shaft or any attachments to it, may be treated in any way including shot peening, cold rolling, hot rolling, scoring, knurling, grinding, mechanical or laser scribing, other laser treatment, sand blasting, chemical treatments, electromechanical treatments, electromagnetic treatments, etc. Further, the shaft itself or any attachments to it may have been subjected to any type of treatment such as vibration shaking; shock; heat treatments; torsional or axial overstraining; magnetic treatments including degaussing, magnetic heating, inverse magnetostriction, and magnetostriction; or any other type of treatment.

Any means may be used to determine which cylinder is or should be firing, such as a flywheel position/speed sensor, a cam shaft sensor, ignition system signaling (such as voltage or current sensing on spark plug wires, distributor, the spark plugs), optical sensor(s), cylinder pressure sensor(s), crankshaft position sensor(s), drive shaft position sensor(s), etc. Any of such cylinder firing stroke detecting means may be located anywhere suitable. Further, the torque related signal sensor 24 may be located anywhere in suitable proximity to the torque transmitting member. In internal combustion engines, this may be in a journal bearing sleeve, the engine block, a bearing cap; at any location along the crankshaft; just before, just after, or inside the transmission; next to the flywheel; along the driveshaft; or in any location along the power train. It may even be located next to a torque disk such as that described in U.S. Pat. No. 4,697,460.

Any of the signals may be either analog or digital, as may any signal processing or any integration, differentiation, or any difference, summation, subtraction, or division. Any measurement, comparison, or processing may be done via analog or digital means. When the term integration is used, it also meant to include a summation, weighted or otherwise, of values over some appropriate range or interval. Further, any signal may be used directly, be amplified, or be transformed in any manner. Any signal may be an instantaneous value, an integrated value, an average value, weighted or otherwise, one or more Fourier components, a filtered value, a summation of other signal values, or any other suitable values representative of the state of stress/strain in the shaft 20. Further, any electronic means for detecting a signal from a sensor 24 or its peak, shape, integrated value, or any other type or form of the signal may be used.

Further, each of the signals described in any and all embodiments may be the raw signal output of sensor 24 or any processed version thereof. Particularly, any or all of the signals may have any or all background components due to inductive coupling, capacitive coupling, electronic biasing, or any other causes subtracted out, filtered out, eliminated via a bridge circuit, or removed by any other means. The signals may also be amplified or phase shifted in any manner as well.

In addition, any sensor may have negative sensitivity rather than positive sensitivity as implied herein in discussions of the various embodiments. Hence, a signal representing an incomplete cylinder firing or a misfire would, for a positive signal to torque sensitivity, be of lesser strength than the signal from a complete firing. In contrast, the incomplete or misfire signal for negative signal to torque sensitivity would be greater than the signal from a complete firing. As would be readily understood by those having skill in the art, either type sensor may be used.

Where the terms power stroke, firing event, or non-firing event are used, they may also refer to some time after the power stroke or firing/non-firing event when the effects are still felt in the shaft. As one example of this, consider the torque level shown in FIG. 12 as generated by a typical four cylinder engine at high RPM. Note that the shape of the torque curve is different from that of the low RPM case shown in FIG. 4. In particular, in the high RPM case, two, rather than one, local torque maxima are delivered per cylinder firing event. In FIG. 13, the first maximum torque point occurs shortly after the spark ignites; the second maximum torque point is the result of inertial forces related to piston deceleration. As shaft RPM increases, the effect of the second torque maximum becomes more and more pronounced. The methods according to the present invention, therefore, may be applicable to either torque peak, that is, signals may be obtained at or near either or both torque maxima and either or both of said signals may be used in any embodiment. The invention is, however, not restricted to the use of signals related to torque maxima, rather any suitable signals may be used. Signals generated by different cylinders or by the same cylinder at different times may be compared.

Though expressed for the most part herein as subtraction, any other suitable method or means for comparing signals, such as division, may be used as well, either instead of, or in addition to, subtraction. Further, many statistical methods or means which can be employed in any form for signal processing are within the scope of the invention. These include averaging (first statistical moment), moving averages, standard deviation (second statistical moment), moving standard deviation, higher statistical moments (moving or otherwise), autocorrelation, etc.

Some embodiments, such as Embodiment 3 wherein the percentage of full, or other, scale signals are calculated, may lend themselves to engine control quite advantageously. In cases, such as the special case delineated in Embodiment 3, where maxima and minima signal levels may be correlated directly with known values of shaft torque, true torque information may be supplied directly to the engine control system. In other cases, useful input to engine control systems may be provided by the relative signal strength values which reflect relative stress/strain/deflection levels in the shaft. Neural networks or other aids may be used to process the information provided by the signal strength values. For example, any system of monitoring and control which recognizes the percentage of full scale being delivered during any given power stroke, or series of power strokes, may be enhanced in performance. For instance, if power for passing is needed, the control system may demand 100%, or nearly 100%, of the full scale signal for each cylinder without actually having determined the value of torque that 100% of the full scale signal corresponded to. If economy is needed, the control system may dictate the percentage of full scale appropriate to maximize gas mileage. In one application, neural networks may learn what percentage of full scale corresponds to the optimum economy or power for any given driving condition and demand that future system response "home in" on that percentage for that given condition.

The sensors 24 may, in any given application, operate via the principle of magnetostriction. Other types of sensors which sense the stress/strain/deflection state of the shaft may be readily used according to the present invention. Emphasis in the specification has been placed on magnetostrictive type sensors since they offer many advantages over other types of sensors and since the embodiments described herein overcome the disadvantages of magnetostrictive sensors. In almost all applications torque is not being directly measured, and the sensor is not a torque sensor. However, a torque sensor may be used whether it is non-magnetostrictive or magnetostrictive.

For example, magnetostrictive sensors may be employed with any type of excitation including constant amplitude voltage, constant amplitude current, constant amplitude flux, direct current, direct voltage, direct flux, constant phase, etc. Further, the sensor may be of any type design and may perform signal detection in any possible way, such as described in SAE paper #890483.

In addition, the method and apparatus according to present invention may be used in any application where comparison of signals which vary with the stress/strain/deflection of the shaft may be used to advantage. Such applications may include engine knock detection, transmissions, electric steering, anti-lock and electric brakes, and traction control systems. For example, in traction control or braking systems, Embodiment 3 may be used at any number of points around an axle shaft circumference. The relative signal strength at each point may be calculated as a percentage of full, or some other, scale signal and employed with a feedback system which typically would vary brake application or engine torque, engine speed or engine power to optimize the signal strength to thereby optimize traction or braking torque.

For internal combustion engines, the method and apparatus according to the present invention may even be used to detect the angular position at which cylinder firing occurs, that is, the peak pulse point. This may be used to control and optimize ignition timing. Shaft RPM may also be determined, since angular distance between firings is known and the time between firings indicated by torque peaks may also be determined.

Any of the locations C, D, E, P, R, T or any others discussed or implied herein may be points or regions of the shaft 20. Although the descriptions herein primarily relate to a four cylinder, four stroke engines, any number of cylinders and any number of strokes may be used. Also, any of the embodiments may be used separately or in combination in any degree with any one, or more than one, of the others. Therefore, it is to be understood that the invention is not to be limited to the specific embodiments disclosed, and that modifications and other embodiments are intended to be included within the scope of the appended claims.

Many modifications and other embodiments of the invention will come to one skilled in the art having the benefit of the teachings presented in the foregoing descriptions and the associated drawings.

What is claimed is:

1. A method for detecting an abnormal combustion event in an internal combustion engine which produces a series of combustion events and which is coupled to a power transmitting member, said method comprising the steps of:
   obtaining a first signal related to stress in the power transmitting member produced by a first at least one combustion event in the internal combustion engine;
   obtaining a second signal related to stress in the power transmitting member produced by a second at least one combustion event in the internal combustion engine,
   wherein the first and second signals are derived, at least in part, from magnetostrictive sensing means; and
   comparing said first stress related signal to said second stress related signal to detect the abnormal combustion event in the operation of the engine.

2. The method of claim 1 wherein said steps of obtaining said first and second signals are performed sufficiently close in time to one another so as to obtain said first and second signals under substantially constant engine ambient conditions including temperature.

3. The method of claim 1 wherein said step of obtaining said second signal comprises the step of obtaining said second signal related to the torsional stress in the member produced during a second at least one combustion event which follows said first at least one combustion event in the series of combustion events.

4. The method of claim 1 wherein all of said first at least one combustion event is different from all of said second at least one combustion event.

5. The method of claim 1 further comprising the step of storing said first signal.

6. The method of claim 1 wherein said step of comparing said first and second signals comprises the steps of subtracting said second signal from said first signal to produce a difference value, and comparing said difference value to a threshold value.

7. The method of claim 6 wherein said step of comparing said difference value comprises the step of comparing said difference value to a threshold to detect misfire.

8. The method of claim 6 wherein said step of comparing said difference value comprises the step of comparing said difference value to a threshold to detect roughness.

9. The method of claim 1 wherein said step of comparing said first and second signals comprises the step of dividing said first and second signals to calculate a ratio value, and comparing said ratio value to a threshold.

10. The method of claim 9 wherein said step of comparing said ratio value comprises the step of comparing said ratio value to a threshold, to detect misfire.

11. The method of claim 9 wherein said step of comparing said ratio value comprises the step of comparing said ratio value to a threshold to detect roughness.

12. The method of claim 1 wherein said steps of obtaining said first and second signals each comprises the step of obtaining at least one of an instantaneous value, a summation of instantaneous values, an integrated value, an average value, at least one Fourier component value, and a filtered value related to the torsional stress in the member produced from said first at least one combustion event and said second at least one combustion event respectively.

13. The method of claim 1 wherein said steps of obtaining said first and second signals each comprise the step of sensing said signals with at least two sensors positioned adjacent the power transmitting member.

14. The method of claim 1 wherein said steps of obtaining said first and second signals each comprise the step of sensing said signals with at least one sensor positioned adjacent the power transmitting member.

15. The method of claim 14 wherein said sensing step comprises sensing with at least one magnetostrictive sensor excited by at least one of a constant amplitude current, a constant amplitude voltage, a constant amplitude magnetic flux, a constant phase, a direct current, a direct voltage, and a direct flux.

16. The method of claim 15 wherein said sensing with said at least one magnetostrictive sensor comprises operating said sensor at resonance.

17. The method of claim 16 wherein said steps of obtaining said first and second signals each comprise the step of triggering said at least one sensor responsive to at least one of an ignition system signal, a cam shaft position signal, a crankshaft position signal, a flywheel position signal, a rod position signal, a drive shaft position signal, and a cylinder position signal.

18. The method of claim 1 wherein said step of obtaining said first signal comprises the step of obtaining at least one signal produced by a first combustion chamber in the internal combustion engine, and wherein said step of obtaining said second signal comprises the step of obtaining at least one signal produced by a second combustion chamber in the internal combustion engine.

19. The method of claim 1 wherein said steps of obtaining said first and second signals each comprise the step of obtaining said first and second signals produced by a first combustion chamber in the internal combustion engine.

20. The method of claim 1 wherein said step of generating said first signal comprises the steps of:
sensing a signal produced by a peak portion of said first at least one combustion event;
sensing a signal produced by a non-peak portion of said first at least one combustion event to produce a reference signal; and
subtracting one of said non-peak reference signal and said peak signal from the other signal to produce said first signal.

21. The method of claim 20 wherein said step of obtaining said second signal comprises the steps of:
sensing a signal produced by a peak portion of said second at least one combustion event;
sensing a signal produced by a non-peak portion of said second at least one combustion event to produce a reference signal; and
subtracting one of said non-peak reference value and said peak signal from the other to produce said second signal.

22. The method of claim 1 wherein said step of obtaining said first signal comprises the step of obtaining a series of signals produced by a series of combustion events of a first combustion chamber in the internal combustion engine.

23. The method of claim 22 wherein said step of comparing said first and second signals comprises the steps of:
calculating a mean and a standard deviation from said first signal series, and
comparing the difference between said second signal and said mean to a multiple of said standard deviation.

24. The method of claim 22 wherein said step of comparing said first and second signals comprises the steps of:
calculating a mean and a variance from said first signal series, and
comparing the square of the difference between said second signal and said mean to a multiple of said variance.

25. The method of claim 22 wherein said step of obtaining said first signal comprises the steps of calculating a scale value from a maximum value and a minimum value of said series of combustion events, and wherein said step of comparing said first and second signals comprises the step of calculating a ratio between said second and first signals.

26. The method of claim 1 wherein said step of obtaining said first signal comprises the steps of calculating a scale value from a maximum value and a minimum value from a first series of combustion events for a combustion chamber, and calculating a ratio between a current signal related to the torsional stress in the member produced by said combustion chamber and the scale value to generate said first signal; and wherein said step of obtaining said second signal comprises the steps of calculating a scale value from a maximum value and a minimum value from a second series of combustion events for said combustion chamber, and calculating a ratio between a current signal related to the torsional stress produced by said combustion chamber and the scale value to generate said second signal.

27. The method of claim 1 wherein said step of obtaining said first signal comprises the steps of calculating a scale value from a maximum value and a minimum value from a first series of combustion events for a first combustion chamber, and calculating a ratio between a current signal related to the torsional stress in the member produced by said first combustion chamber and the scale value to generate said first signal; and wherein said step of obtaining said second signal comprises the steps of calculating a scale value from a maximum value and a minimum value from a second series of combustion events for a second combustion chamber, and calculating a ratio between a current signal related to the torsional stress produced by a second combustion chamber and the scale value to generate said second signal.

28. The method of claim 1 wherein said step of obtaining said first signal comprises the steps of calculating a scale value from series of peak values and a non-peak values obtained at predetermined times from a first series of combustion events for a combustion chamber, and calculating a ratio between a current signal related to the torsional stress in the member produced by said combustion chamber and the scale value to generate said first signal; and wherein said step of obtaining said second signal comprises the steps of calculating a scale value from a series of peak values and a non-peak values at predetermined times from a second series of combustion events for said combustion chamber, and calculating a ratio between a current signal related to the torsional stress produced by said combustion chamber and the scale value to generate said second signal.

29. The method of claim 1 wherein said step of obtaining said first signal comprises the steps of calculating a scale value from peak values and non-peak values obtained at predetermined points from a first series of combustion events for a first combustion chamber, and calculating a ratio between a current signal related to the torsional stress in the member produced by said first combustion chamber and the scale value to generate said first signal; and wherein said step of obtaining said second signal comprises the steps of calculating a scale value from peak values and non-peak values at predetermined points from a second series of combustion events for a second combustion chamber, and calculating a ratio between a current signal related to the torsional stress produced by a second combustion chamber and the scale value to generate said second signal.

30. The method of claim 1 further comprising setting a flag for the occurrence of a first number of abnormal combustion events, and giving an abnormal combustion event indication for a second number of flags occurring during at least one of a predetermined period of time, a predetermined mileage and a predetermined number of cylinder firings.

31. A method for detecting a torque producing event in a power transmitting member which experiences a series of torque producing events, said method comprising the steps of:
obtaining a first signal related to stress in the power transmitting member produced by a first at least one torque producing event experienced by the power transmitting member;
obtaining a second signal related to stress in the power transmitting member produced by a second at least one torque producing event experienced by the power transmitting member,
wherein the first and second signals are derived, at least in part, from magnetostrictive sensing; and
comparing said first signal to said second signal to detect the torque producing event.

32. The method of claim 31 wherein said power transmitting member is an axle of a vehicle and wherein said method further comprises the step of providing an indication of the torque producing event to a traction control system.

33. The method of claim 31 wherein the power transmitting member is operatively coupled to at least one of an engine transmission, a braking system, and a vehicle steering system.

34. An apparatus for detecting an abnormal combustion event, such as a misfire or roughness, in an internal combustion engine which produces a series of combustion events and which is coupled to a power transmitting member, said apparatus comprising:
  means for obtaining a first signal and a second signal, said first signal being related to stress in the member produced by a first at least one combustion event, said second signal being related to stress in the member produced by a second at least one combustion event,
  wherein at least part of the signal obtaining means comprises a magnetostrictive sensor; and
  processing means for comparing said first and second signals to detect the abnormal combustion event.

35. The apparatus of claim 34 further comprising timing trigger means cooperating with said signal obtaining means for generating said first and second signals wherein said timing trigger means provides a means for determining when to sample a magnetostrictive based signal from the magnetostrictive sensor.

36. The apparatus of claim 35 wherein said timing trigger means comprises a sensor positioned adjacent a flywheel coupled to the engine, and wherein said flywheel sensor is adapted to generate a timing pulse for a predetermined amount of rotation of the flywheel.

37. The apparatus of claim 35 wherein said timing trigger means comprises a sensor located adjacent a portion of a power transmitting assembly, and wherein said sensor is adapted to generate a timing signal for a predetermined amount of rotation of the portion of the power transmitting assembly.

38. The apparatus of claim 34 wherein said signal obtaining means comprises at least two magnetostrictive sensors positioned adjacent the power transmitting member.

39. The apparatus of claim 34 wherein said signal obtaining means comprises at least one magnetostrictive sensor positioned adjacent the power transmitting member.

40. The apparatus of claim 39 wherein said magnetostrictive sensor comprises at least one of a cross design sensor, a C-core sensor, a single branch sensor, a dual branch sensor, and a multi-branch sensor.

41. The apparatus of claim 39 wherein said at least one magnetostrictive sensor is excited by at least one of a constant amplitude current, a constant amplitude voltage, a constant amplitude magnetic flux, a constant phase, a direct current, a direct voltage, and a direct flux.

42. The apparatus of claim 39 wherein said at least one magnetostrictive sensor is operating at resonance.

43. The apparatus of claim 39 wherein said at least one magnetostrictive sensor is operating at above resonance.

44. The apparatus of claim 39 wherein said at least one magnetostrictive sensor is operating at below resonance.

45. The apparatus of claim 39 wherein said at least one magnetostrictive sensor is positioned adjacent a bearing cap.

46. The apparatus of claim 39 wherein the power transmitting member is the crankshaft of the engine, and wherein said at least one magnetostrictive sensor is positioned within a bearing cap adjacent the crankshaft of the engine.

47. The apparatus of claim 46 wherein said at least one magnetostrictive sensor is a cross design sensor.

48. The apparatus of claim 39 wherein the engine has a back end connected to a drive shaft and a front end opposite said back end, and wherein said magnetostrictive sensor is positioned adjacent said front end of the engine.

49. The apparatus of claim 34 wherein the engine is coupled to a transmission and wherein at least part of said signal obtaining means is positioned adjacent said transmission.

50. The apparatus of claim 34 further comprising means for identifying a cylinder for a combustion event.

51. The apparatus of claim 50 wherein said cylinder identifying means comprises a cam shaft position sensor.

52. The apparatus of claim 34 wherein said processing means comprises an electronic microprocessor operating under stored program control.

53. The apparatus of claim 52 wherein said processing means includes means for subtracting said second signal from said first signal to produce a difference value, and for comparing said difference value to a threshold value.

54. The apparatus of claim 53 wherein said processing means includes means for comparing said difference value to a threshold to detect misfire.

55. The apparatus of claim 52 wherein said processing means includes means for comparing said difference value to a threshold to detect roughness.

56. The apparatus of claim 52 wherein said processing means includes means for dividing said first and second signals to calculate a ratio value, and for comparing said ratio value to a threshold.

57. The apparatus of claim 56 wherein said processing means includes means for comparing said ratio value to a first threshold to detect misfire, and for comparing said ratio value to a second threshold to detect roughness.

58. The apparatus of claim 52 wherein said processing means includes means for calculating a mean and a standard deviation from a series of said first signals, and for comparing a difference between said second signal and said mean to a multiple of said standard deviation.

59. The apparatus of claim 52 wherein said processing means includes means for calculating a mean and a variance from a series of said first signals, and for comparing the square of a difference between said second signal and said mean to a multiple of said variance.

60. The apparatus of claim 34 wherein said processing means comprises a neural network.

61. A method for detecting an abnormal combustion event, such as a misfire or roughness, in an internal combustion engine which produces a series of combustion events and which is coupled to a power transmitting member, said method comprising the steps of:
  obtaining at least one first pair of signals from an at least one first pair of successive combustion events, each signal related, at least in part via magnetostriction to the torsional stress in the member produced by a respective one of the combustion events;

calculating a difference between each signal in the at least one first pair of signals;

obtaining a second pair of signals from a second pair of successive combustion events, each signal related, at least in part via magnetostriction to the torsional stress in the member produced by a respective one of the second pair of successive combustion events;

calculating a difference between each signal in the second pair of signals; and comparing the difference between the at least one first pair of signals to the difference between the second pair of signals to detect an abnormal combustion event in the operation of the engine.

62. The method of claim 61 wherein the step of obtaining the at least one first pair of signals comprises the step of obtaining a plurality of pairs of signals from a corresponding plurality of pairs of combustion events, and further comprising the step of obtaining an average difference for the plurality of pairs of signals to compare to the difference between the second pair of signals.

63. A method of detecting an abnormal combustion event in an internal combustion engine which produces a series of combustion events and which is coupled to a power transmitting member, said method comprising the steps of:

obtaining a first signal related to stress in the power transmitting member produced by a first at least one combustion event in the internal combustion engine;

obtaining a second signal related to stress in the power transmitting member produced by a second at least one combustion event in the internal combustion engine; and comparing said first stress related signal to said second stress related signal to detect the abnormal combustion event in the operation of the engine, wherein said step of obtaining said first signal comprises the steps of:

sensing a signal produced by a peak portion of said first at least one combustion event;

sensing a signal produced by a non-peak portion of said first at least one combustion event to produce a reference signal; and subtracting one of said non-peak reference signal and said peak signal from the other to produce said first signal.

64. The method of claim 63 wherein said step of obtaining said second signal comprises the steps of:

sensing a signal produced by a peak portion of said second at least one combustion event;

sensing a signal produced by a non-peak portion of said second at least one combustion event to produce a reference signal; and subtracting one of said non-peak reference signal and said peak signal from the other to produce said second signal.

65. A method for detecting an abnormal combustion event in an internal combustion engine which produces a series of combustion events and which is coupled to a power transmitting member, said method comprising the steps of:

obtaining a first signal related to stress in the power transmitting member produced by a first at least one combustion event in the internal combustion engine;

obtaining a second signal related to stress in the power transmitting member produced by a second at least one combustion event in the internal combustion engine; and comparing said first stress related signal to said second stress related signal to detect the abnormal combustion event in the operation of the engine, wherein said step of obtaining said first signal comprises the step of obtaining a series of signals produced by a series of combustion events of a first combustion chamber in the internal combustion engine, and wherein said step of comparing said first and second signals comprises the steps of:

calculating a mean and a standard deviation from said first signal series, and comparing the difference between said second signal and said mean to a multiple of said standard deviation.

66. A method for detecting an abnormal combustion event in an internal combustion engine which produces a series of combustion events and which is coupled to a power transmitting member, said method comprising the steps of:

obtaining a first signal related to stress in the power transmitting member produced by a first at least one combustion event in the internal combustion engine;

obtaining a second signal related to stress in the power transmitting member produced by a second at least one combustion event in the internal combustion engine; and comparing said first stress related signal to said second stress related signal to detect the abnormal combustion event in the operation of the engine, wherein said step of obtaining said first signal comprises the step of obtaining a series of signals produced by a series of combustion events of a first combustion chamber in the internal combustion engine, and wherein said step of comparing said first and second signals comprises the steps of:

calculating a mean and a variance from said first signal series, and comparing a square of a difference between said second signal and said mean to a multiple of said variance.

67. A method for detecting an abnormal combustion event in an internal combustion engine which produces a series of combustion events and which is coupled to a power transmitting member, said method comprising the steps of:

obtaining a first signal related to stress in the power transmitting member produced by a first at least one combustion event in the internal combustion engine;

obtaining a second signal related to stress in the power transmitting member produced by a second at least one combustion event in the internal combustion engine; and comparing said first stress related signal to said second stress related signal to detect the abnormal combustion event in the operation of the engine, wherein said step of obtaining said first signal comprises the step of obtaining a series of signals produced by a series of combustion events of a first combustion chamber in the internal combustion engine, and the steps of calculating a scale value from a maximum value and a minimum value of said series of combustion events, and wherein said step of comparing said first and second signals comprises the step of calculating a ratio between said second and first signals.

68. A method for detecting an abnormal combustion event in an internal combustion engine which produces a series of combustion events and which is coupled to a power transmitting member, said method comprising the steps of:

obtaining a first signal related to stress in the power transmitting member produced by a first at least one combustion event in the internal combustion engine;

obtaining a second signal related to stress in the power transmitting member produced by a second at least one combustion event in the internal combustion engine, and comparing said first stress related signal to said second stress related signal to detect the abnormal combustion event in the operation of the engine, wherein said step of obtaining said first signal comprises the steps of calculating a scale value from a maximum value and a minimum value from a first series of combustion events for a combustion chamber, and calculating a ratio between a current signal related to the stress in the member produced by said combustion chamber and the scale value to generate said first signal; and wherein said step of obtaining said second signal comprises the steps of calculating a scale value from a maximum value and a minimum value from a second series of combustion events for said combustion chamber, and calculating a ratio between a current signal related to the stress produced by said combustion chamber and the scale value to generate said second signal.

69. A method for detecting an abnormal combustion event in an internal combustion engine which produces a series of combustion events and which is coupled to a power transmitting member, said method comprising the steps of:

obtaining a first signal related to stress in the power transmitting member produced by a first at least one combustion event in the internal combustion engine;

obtaining a second signal related to stress in the power transmitting member produced by a second at least one combustion event in the internal combustion engine; and comparing said first stress related signal to said second stress related signal to detect the abnormal combustion event in the operation of the engine, wherein said step of obtaining said first signal comprises the steps of calculating a scale value from a maximum value and a minimum value from a first series of combustion events for a first combustion chamber, and calculating a ratio between a current signal related to the stress in the member produced by said first combustion chamber and the scale value to generate said first signal; and wherein said step of obtaining said second signal comprises the steps of calculating a scale value from a maximum value and a minimum value from a second series of combustion events for a second combustion chamber, and calculating a ratio between a current signal related to the stress produced by a second combustion chamber and the scale value to generate said second signal.

70. A method for detecting an abnormal combustion event in an internal combustion engine which produces a series of combustion events and which is coupled to a power transmitting member, said method comprising the steps of:

obtaining a first signal related to stress in the power transmitting member produced by a first at least one combustion event in the internal combustion engine;

obtaining a second signal related to stress in the power transmitting member produced by a second at least one combustion event in the internal combustion engine; and comparing said first stress related signal to said second stress related signal to detect the abnormal combustion event in the operation of the engine, wherein said step of obtaining said first signal comprises the steps of calculating a scale value from a series of peak values and non-peak values obtained at predetermined times from a first series of combustion events for a combustion chamber, and calculating a ratio between a current signal related to the stress in the member produced by said combustion chamber and the scale value to generate said first signal; and wherein said step of obtaining said second signal comprises the steps of calculating a scale value from a series of peak values and a non-peak values at predetermined times from a second series of combustion events for said combustion chamber, and calculating a ratio between a current signal related to the stress produced by said combustion chamber and the scale value to generate said second signal.

71. A method for detecting an abnormal combustion event in an internal combustion engine which produces a series of combustion events and which is coupled to a power transmitting member, said method comprising the steps of:

obtaining a first signal related to stress in the power transmitting member produced by a first at least one combustion event in the internal combustion engine;

obtaining a second signal related to stress in the power transmitting member produced by a second at least one combustion event in the internal combustion engine; and comparing said first stress related signal to said second stress related signal to detect the abnormal combustion event in the operation of the engine, wherein said step of obtaining said first signal comprises the steps of calculating a scale value from peak values and non-peak values obtained at predetermined points from a first series of combustion events for a first combustion chamber, and calculating a ratio between a current signal related to the stress in the member produced by said first combustion chamber and the scale value to generate said first signal; and wherein said step of obtaining said second signal comprises the steps of calculating a scale value from peak values and non-peak values at predetermined points from a second series of combustion events for a second combustion chamber, and calculating a ratio between a current signal related to the stress produced by a second combustion chamber and the scale value to generate said second signal.

72. As apparatus for detecting an abnormal combustion event, such as a misfire or roughness, in an internal combustion engine which produces a series of combustion events and which is coupled to a power transmitting member, said apparatus comprising:

means for obtaining a first signal and a second signal from the power transmitting member, said first signal being related to stress in the power transmitting member produced by a first at least one combustion event, said second signal being related to stress in the power transmitting member produced by a second at least one combustion event; and processing means for comparing said first and second signals to detect the abnormal combustion event wherein said processing means comprises an electronic microprocessor operating under stored program control, wherein said processing means includes means for dividing said first and second signals to calculate a ratio value, for comparing said ratio value to a first threshold to detect misfire, and for comparing said ratio value to a second threshold to detect roughness.

73. An apparatus for detecting an abnormal combustion event, such as a misfire or roughness, in an internal combustion engine which produces a series of combustion events and which is coupled to a power transmitting member, said apparatus comprising:

means for obtaining a first signal and a second signal from the power transmitting member, said first signal being related to stress in the power transmitting member produced by a first at least one combustion event, said second signal being related to stress in the power transmitting member produced by a second at least one combustion event; and processing means for comparing said first and second signals to detect the abnormal combustion event wherein said processing means comprises an electronic microprocessor operating under stored program control, wherein said processing means includes means for calculating a mean and a standard deviation from a series of said first signals, and for comparing a difference between said second signal and said mean to a multiple of said standard deviation.

74. An apparatus for detecting an abnormal combustion event, such as a misfire or roughness, in an internal combustion engine which produces a series of combustion events and which is coupled to a power transmitting member, said apparatus comprising:

means for obtaining a first signal and a second signal from the power transmitting member, said first signal being related to stress in the power transmitting member produced by a first at least one combustion event, said second signal being related to stress in the power transmitting member produced by a second at least one combustion event; and processing means for comparing said first and second signals to detect the abnormal combustion event wherein said processing means comprise an electronic microprocessor operating under stored program control, wherein said processing means includes means for calculating a mean and a variance from a series of said first signals, and for comparing a square of a difference between said second signal and said mean to a multiple of said variance.

* * * * *